(12) United States Patent
Maeda et al.

(10) Patent No.: US 8,891,961 B2
(45) Date of Patent: Nov. 18, 2014

(54) OPTICAL COMMUNICATION DEVICE, WAVELENGTH NUMBER MEASUREMENT DEVICE, OPTICAL REPEATER, AND WAVELENGTH NUMBER MEASUREMENT METHOD

(71) Applicant: Fujitsu Limited, Kawasaki (JP)

(72) Inventors: Taizo Maeda, Kawasaki (JP); Takashi Toyomaki, Kawasaki (JP); Takuya Miyashita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 99 days.

(21) Appl. No.: 13/711,773

(22) Filed: Dec. 12, 2012

(65) Prior Publication Data

US 2013/0156422 A1 Jun. 20, 2013

(30) Foreign Application Priority Data

Dec. 19, 2011 (JP) ................................. 2011-277515

(51) Int. Cl.
H04B 10/04 (2006.01)
H04B 10/08 (2006.01)
H04B 17/00 (2006.01)
H04J 14/02 (2006.01)
H04B 10/079 (2013.01)

(52) U.S. Cl.
CPC ............................... H04B 10/07957 (2013.01)
USPC .................. 398/34; 398/93; 398/95; 398/196

(58) Field of Classification Search
USPC ............... 398/92, 157, 34, 42, 43, 79, 82, 91, 398/93–95, 195–197
See application file for complete search history.

(56) References Cited

U.S. PATENT DOCUMENTS

| 6,701,090 | B1 * | 3/2004 | Hatayama et al. | 398/79 |
| 6,748,176 | B1 * | 6/2004 | Inagaki et al. | 398/85 |
| 8,208,812 | B2 * | 6/2012 | Tokura et al. | 398/94 |
| 2002/0171889 | A1 * | 11/2002 | Takeuchi et al. | 359/124 |
| 2010/0129079 | A1 * | 5/2010 | Bato et al. | 398/79 |
| 2011/0317999 | A1 * | 12/2011 | Tanaka | 398/34 |

FOREIGN PATENT DOCUMENTS

JP 2001-249368 9/2001

OTHER PUBLICATIONS

Patent Abstracts of Japan, Publication No. 2001-249368, Published Sep. 14, 2001.
"Principle of Four-Wave Mixing", Retrieved from http://www.symphotony.com/optipedia/optics/FWM2.html, 5 pages, © 2009.

* cited by examiner

Primary Examiner — Dalzid Singh
(74) Attorney, Agent, or Firm — Staas & Halsey LLP

(57) ABSTRACT

In an optical communication device, a light source is capable of varying the wavelength of light to be output. An optical multiplexer multiplexes light output from the light source with signal light received from a transmission path. To an optical medium, light output from the optical multiplexer is input. A monitor monitors light having a predetermined wavelength output from the optical medium. A wavelength number measuring unit measures the number of wavelengths of signal light transmitted through the transmission path based on the result of monitoring by the monitor.

6 Claims, 23 Drawing Sheets

| No | WAVELENGTH | ch |
|----|------------|-----|
| 1 | 1528.77 | |
| 2 | 1529.55 | |
| 3 | 1530.33 | |
| 4 | 1531.12 | |
| 5 | 1531.90 | |
| 6 | 1532.68 | |
| 7 | 1533.47 | |
| 8 | 1534.25 | |
| 9 | 1535.04 | |
| 10 | 1535.82 | |
| 11 | 1536.61 | |
| 12 | 1537.40 | |
| 13 | 1538.19 | |
| 14 | 1538.98 | |
| 15 | 1539.77 | |
| 16 | 1540.56 | ch1 |
| 17 | 1541.35 | |
| 18 | 1542.14 | ch2 |
| 19 | 1542.94 | |
| 20 | 1543.73 | |
| 21 | 1544.53 | |
| 22 | 1545.32 | ch3 |
| 23 | 1546.12 | |
| 24 | 1546.92 | |
| 25 | 1547.72 | |
| 26 | 1548.51 | ch4 |
| 27 | 1549.32 | |
| 28 | 1550.12 | |
| 29 | 1550.92 | |
| 30 | 1551.72 | |
| 31 | 1552.52 | |
| 32 | 1553.33 | |
| 33 | 1554.13 | |
| 34 | 1554.94 | |
| 35 | 1555.75 | |
| 36 | 1556.55 | |
| 37 | 1557.36 | |
| 38 | 1558.17 | |
| 39 | 1558.98 | |
| 40 | 1559.79 | |

A31 →

| | | | |
|---|---|---|---|
| a11 | a11 | a11 | a11 |
| | | | |
| | | | |
| | | | |
| | | | |
| | | | |
| | | | |
| | | | |
| y11 | | | |
| | y12 | | |
| | | | |
| | | y13 | |
| | | | |
| | | | y14 |
| | | | |
| x11 | | | |
| | | | |
| | x12 | | |
| | | | |
| | | | |
| | | | |
| | | x13 | |
| b11 | | | |
| | | | |
| | | | |
| | b12 | | x14 |
| | | | |
| | | | |
| | | | |
| | | | |
| | | | |
| | | b13 | |
| | | | |
| | | | |
| | | | |
| | | | |
| | | | |
| | | | |
| | | | b14 |

| SIGNAL LIGHT | ch1 | | ch2 | | ch3 | | ch4 | |
|---|---|---|---|---|---|---|---|---|
| SIGNAL LIGHT PRESENCE/ABSENCE | PRESENCE | ABSENCE | PRESENCE | ABSENCE | PRESENCE | ABSENCE | PRESENCE | ABSENCE |
| POLARIZATION PARALLEL | -14.4 | -100.0 | -16.0 | -100.0 | -15.6 | -100.0 | -12.0 | -100.0 |
| POLARIZATION ORTHOGONAL | -17.4 | -100.0 | -19.0 | -100.0 | -18.6 | -100.0 | -15.0 | -100.0 |
| POLARIZATION PARALLEL + ASE | -14.1 | -27.0 | -15.6 | -27.0 | -15.3 | -27.0 | -11.9 | -27.0 |
| POLARIZATION ORTHOGONAL + ASE | -16.9 | -27.0 | -18.3 | -27.0 | -18.0 | -27.0 | -14.8 | -27.0 |
| ON/OFF RATIO(dB) | 10.1 | | 8.7 | | 9.0 | | 12.2 | |
| DETERMINATION THRESHOLD VALUE | -20.0 | | | | | | | |
| DETERMINATION RESULT | on | off | on | off | on | off | on | off |

OPTICAL COMMUNICATION DEVICE, WAVELENGTH NUMBER MEASUREMENT DEVICE, OPTICAL REPEATER, AND WAVELENGTH NUMBER MEASUREMENT METHOD

CROSS-REFERENCE TO RELATED APPLICATION

This application is based upon and claims the benefit of priority of the prior Japanese Patent Application No. 2011-277515, filed on Dec. 19, 2011, the entire contents of which are incorporated herein by reference.

FIELD

The embodiments discussed herein relate to an optical communication device that receives a light signal, a wavelength number measurement device, an optical repeater, and a wavelength number measurement method.

BACKGROUND

Some optical communication devices that receive WDM (Wavelength Division Multiplexing) signal light perform ALC (Automatic Level Control) so that the level of received signal light is constant at a predetermined value. In ALC, the level of signal light is controlled to be constant at a predetermined value by monitoring the output power of an amplifier and controlling the output power of the amplifier to be constant.

Moreover, there is a case where signal light may include ASE (Amplified Spontaneous Emission) light when amplified by an amplifier. Therefore, if the power of the ASE light included in the output power of the amplifier becomes relatively large compared to the power of the signal light, the level of the signal light is controlled to be constant, at a value smaller than a value to be controlled constant by ALC. Consequently, there is known ASE correction to correct the level drop of the signal light due to the ASE light.

The ALC and ASE correction need information of number of wavelengths of signal light. It is possible for an optical communication device that performs ALC and ASE correction to know the number of wavelengths of signal light by, for example, an OSC (Optical Supervisory Channel).

Note that, conventionally, a wavelength conversion device is provided, which extracts one or two or more beams of signal light (signal light to be subjected to wavelength conversion) to be subjected to wavelength conversion from a plurality of beams of signal light transmitted by WDM with an optical part having the filtering function to give light to be wavelength-converted and performs wavelength conversion on the light (for example, see Japanese Laid-Open Patent No. 2001-249368).

However, there is such a problem in the conventional optical transmission system that the optical communication device on the reception side, to perform ALC or ASE correction, needs a device to transmit information of number of wavelengths to the optical communication device on the transmission side, and therefore, the cost of the optical transmission system is raised.

For example, the optical communication device on the transmission side needs a device to transmit an OSC including information of number of wavelengths, and therefore, the cost of the optical transmission system is raised.

SUMMARY

According to an aspect, there is provided an optical communication device having a light source capable of varying the wavelength of light to be output, a wavelength controller configured to control the wavelength of the light source, an optical multiplexer configured to multiplex light output from the light source with the signal light received from a transmission path, an optical medium to which light output from the optical multiplexer is input, a monitor configured to monitor light having a predetermined wavelength output from the optical medium, and a wavelength number measuring unit configured to measure the number of wavelengths of signal light transmitted through the transmission path based on the result of monitoring by the monitor.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 explains a relationship between signal light, wavelength variable light, and FWM light;

FIG. 9 explains the wavelength number measurement;

DESCRIPTION OF EMBODIMENTS

Figure 1:
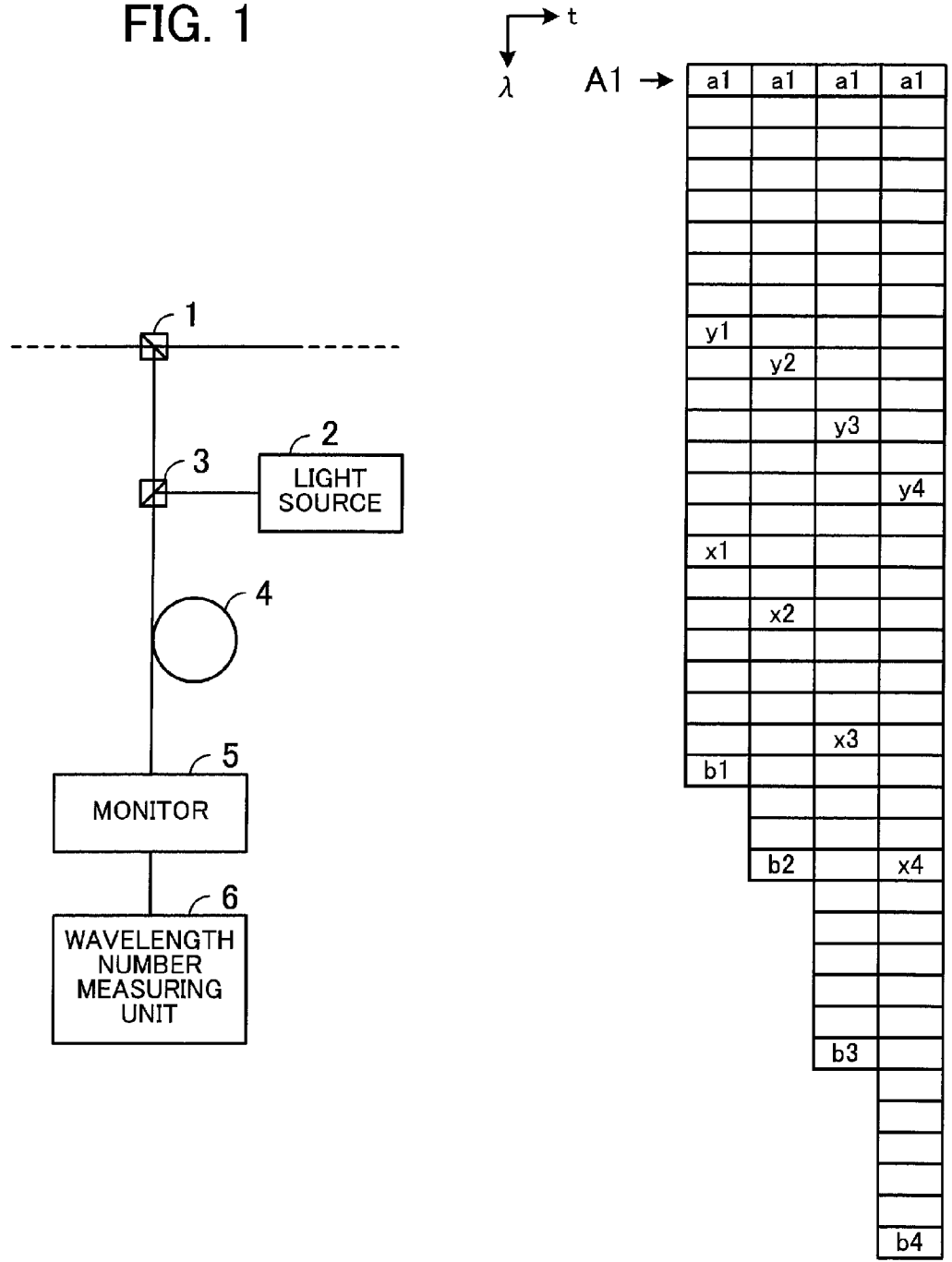
FIG. 1 explains an optical communication device according to a first embodiment.

Several embodiments will be described below with reference to the accompanying drawings, wherein like reference numerals refer to like elements throughout.

First Embodiment

FIG. 1 explains an optical communication device according to a first embodiment. FIG. 1 illustrates an optical communication device that receives WDM signal light and an operation explanatory diagram for explaining the operation of the optical communication device.

As illustrated in FIG. 1, the optical communication device has an optical demultiplexer 1, a light source 2, an optical multiplexer 3, an optical medium 4, a monitor 5, and a wavelength number measuring unit 6.

To the optical demultiplexer 1, light having propagated through a transmission path, not illustrated schematically, is input. That is, to the optical demultiplexer 1, signal light the optical communication device on the transmission side has transmitted is input. The optical demultiplexer 1 demultiplexes light that is input and outputs the light to the optical multiplexer 3 and a received signal processing device in the subsequent stage, not illustrated schematically.

The light source 2 outputs, for example, CW (Continuous Wave) light. The light source 2 includes a wavelength controller and controls the wavelength of light output from the light source. The wavelength controller may be implemented by a processor, a circuit, an FPGA (Field-Programmable Gate Array), etc. In the following, light the light source 2 outputs is sometimes referred to as wavelength variable light.

To the optical multiplexer 3, light output from the optical demultiplexer 1 and wavelength variable light output from the light source 2 are input. The optical multiplexer 3 multiplexes the wavelength variable light output from the light source 2 with the light output from the optical demultiplexer 1.

The optical medium 4 generates FWM (Four Wave Mixing) light by the light output from the optical multiplexer 3.

The monitor 5 monitors FWM light having a predetermined wavelength output from the optical medium 4.

The wavelength number measuring unit 6 measures the number of wavelengths of the signal light that the optical communication device on the transmission side has transmitted based on the result of monitoring of the FWM light by the monitor 5. It is possible to implement the wavelength number measuring unit 6 by a processor, a circuit, an FPGA, etc.

The operation of the optical communication device is explained using an operation explanatory diagram. The operation explanatory diagram illustrated on the right side of FIG. 1 illustrates an example of a relationship among signal light that the optical communication device receives, wavelength variable light that the light source 2 outputs, and FWM light that is generated in the optical medium 4. The longitudinal direction of the operation explanatory diagram represents wavelength and the lateral direction represents time.

Symbols x1 to x4 illustrated in the operation explanatory diagram represent wavelengths of the signal light that the optical communication device on the transmission side transmits. That is, it is assumed that from the optical communication device on the transmission side, signal light having the four wavelengths x1 to x4 is wavelength-multiplexed and transmitted.

Symbols y1 to y4 represent wavelengths of the wavelength variable light that the light source 2 outputs. Symbols a1 and b1 to b4 represent wavelengths of the FWM light output from the optical medium 4. The monitor 5 monitors light having the wavelength a1 output from the optical medium 4. That is, the monitor 5 monitors the light having the wavelength indicated by an arrow A1 of FIG. 1.

As described above, the light source 2 varies the wavelength of light to be output. When the wavelength of the light output from the light source 2 is the wavelength y1, from the optical medium 4, the FWM light having the wavelengths a1 and b1 is output by the wavelength variable light having the wavelength y1 to be incident to the optical medium 4 and the signal light having the wavelength x1. From the optical medium 4, the light (FWM light) having the wavelength a1 is output, and therefore, the monitor 5 monitors (detects) the light having the wavelength a1.

The light source 2 further varies the wavelength of light to be output from the wavelength y1. When the wavelength of the light output from the light source 2 is the wavelength y2, from the optical medium 4, the FWM light having the wavelengths a1 and b2 is output by the wavelength variable light having the wavelength y2 to be incident to the optical medium 4 and the signal light having the wavelength x2. From the optical medium 4, the FWM light having the wavelength a1 is output, and therefore, the monitor 5 detects the light having the wavelength a1.

The light source 2 further varies the wavelength of light to be output from the wavelength y2. When the wavelength of the light output from the light source 2 is the wavelength y3, from the optical medium 4, the FWM light having the wavelengths a1 and b3 is output by the wavelength variable light having the wavelength y3 to be incident to the optical medium 4 and the signal light having the wavelength x3. From the optical medium 4, the FWM light having the wavelength a1 is output, and therefore, the monitor 5 detects the light having the wavelength a1.

The light source 2 further varies the wavelength of light to be output from the wavelength y3. When the wavelength of the light output from the light source 2 is the wavelength y4, from the optical medium 4, the FWM light having the wavelengths a1 and b4 is output by the wavelength variable light having the wavelength y4 to be incident to the optical medium 4 and the signal light having the wavelength x4. From the optical medium 4, the FWM light having the wavelength a1 is output, and therefore, the monitor 5 detects the light having the wavelength a1.

The wavelength number measuring unit 6 measures the number of wavelengths of the signal light that the optical communication device on the transmission side transmits by, for example, the number of beams of light having the wavelength a1 monitored by the monitor 5. For example, in the above-described case, the monitor 5 monitors the four beams of FWM light, and therefore, it is possible for the wavelength number measuring unit 6 to measure that the signal light having four wavelengths is transmitted from the optical communication device on the transmission side.

That is, the optical communication device illustrated in FIG. 1 generates wavelength variable light, multiplexes the wavelength variable light with light received from the transmission path, and monitors the FWM light that is generated with the predetermined wavelength a1. Then, the optical communication device measures the number of wavelengths of the signal light having the wavelengths x1, x2, x3, and x4.

In this manner, the optical communication device causes the light received from the transmission path and the wavelength variable light to enter the optical medium 4 that generates FWM light and monitors the FWM light having the predetermined wavelength output from the optical medium 4. Then, the optical communication device measures the number of wavelengths of the signal light transmitted through the transmission path based on the result of monitoring of the FWM light.

Due to this, it is possible for the optical communication device that receives signal light to know the number of wavelengths of the light to be received even if information of number of wavelengths is not notified from the optical communication device on the transmission side and for example, it is possible to perform ALC and ASE correction. That is, it is not necessary for the optical communication device on the transmission side to include a device to transmit information of number of wavelengths, and therefore, which makes it possible to reduce the cost of the optical transmission system.

Second Embodiment

Next, a second embodiment is explained in detail with reference to the drawings.

Figure 2:
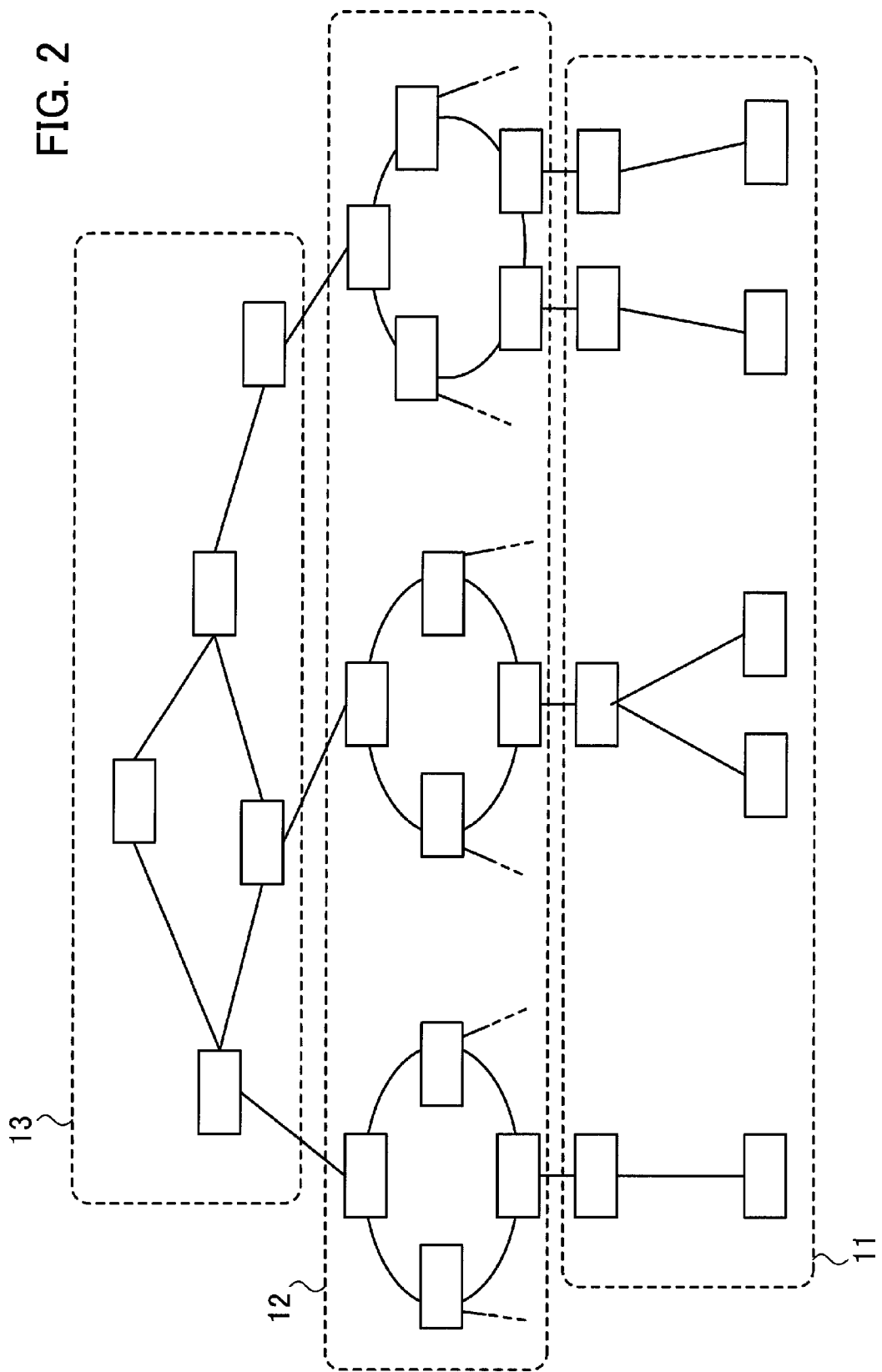
FIG. 2 illustrates an optical transmission system according to a second embodiment.

FIG. 2 illustrates an optical transmission system according to the second embodiment. A rectangle illustrated in FIG. 2 represents an optical communication device. The optical transmission system includes a plurality of optical communication devices connected by optical fibers.

The optical transmission system, for example as illustrated in FIG. 2, is divided into an access network 11, a metro network 12, and a core network 13. The access network 11 is a network that connects, for example, the metro network 12 and an end user. The metro network 12 is a network formed in areas, for example, urban areas. The core network 13 is, for example, a long-distance backbone network that connects the metro networks 12.

In the access network 11, the number of optical communication devices is large compared to DWDM (Dense WDM) applied to the metro network 12 and the core network 13. Therefore, the optical communication device used in the access network 11 is requested to be inexpensive rather than excellent in performance. Further, in the access network 11, the number of wavelengths of signal light transmitted by WDM is small and for example, four to eight waves are used in many cases.

There may be a case where signal light includes ASE light when amplified by an amplifier. Therefore, as will be explained later in detail, when the power of the ASE light included in the output power of the amplifier becomes relatively large compared to the power of the signal light, the level of the signal light is controlled to be constant at a value smaller than a predetermined value to be subjected to ALC.

As described above, in an access optical transmission system, the signal light is used with a small number of waves, for example, four to eight waves in many cases. Therefore, in the access optical transmission system, the power of ASE light tends to become relatively large compared to the power of signal light and the signal light tends to deteriorate. Further, in the access optical transmission system, for example, when the fiber loss is large or when repeater nodes are cascade-connected, the power of ASE signal tends to become relatively large compared to the power of signal light. In this case, in the optical communication device on the reception side, the level of signal light decreases and deterioration of a transmitted signal occurs.

A method for suppressing signal deterioration caused by ASE light includes ASE correction. In the ASE correction, the gain of ALC is increased or decreased in accordance with the number of wavelengths in order to keep the peak level of signal light at a predetermined value. For example, in the ASE correction, when the number of wavelengths is small, the gain of ALC is increased to keep the peak level of signal light that decreases due to ASE light at a predetermined value.

Figure 3:
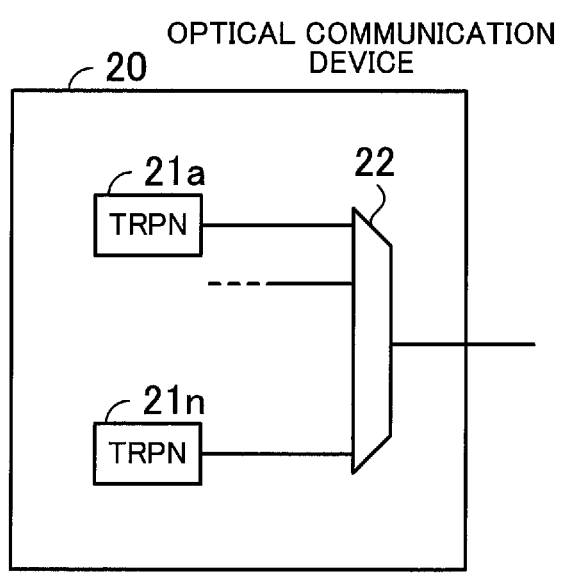
FIG. 3 is a block diagram of an optical communication device on the transmission side.

FIG. 3 is a block diagram of an optical communication device on the transmission side. FIG. 3 illustrates an optical communication device 20 on the transmission side that transmits signal light. The optical communication device 20 has TRPNs (TRansPoNder) 21a to 21n and an optical multiplexer 22.

To the TRPNs 21a to 21n, signal to be transmitted to the optical communication device on the reception side is input. The TRPNs 21a to 21n convert respective signals that are input into signal light having different wavelengths and output the signal light to the optical multiplexer 22.

The optical multiplexer 22 wavelength-multiplexes the signal light output from the TRPNs 21a to 21n. The signal light wavelength-multiplexed in the optical multiplexer 22 is output to the transmission path.

The optical communication device 20 is provided, for example, in the access network 11 of FIG. 2 and transmits WDM signal light of four to eight waves to the optical communication device on the reception side. Further, as described above, in the access network 11, the optical communication device 20 is requested to be inexpensive. Therefore, the optical communication device 20 does not include, for example, a device to transmit an OSC. That is, the optical communication device 20 does not transmit wavelength information of the signal light to the optical communication device on the reception side.

Figure 4:
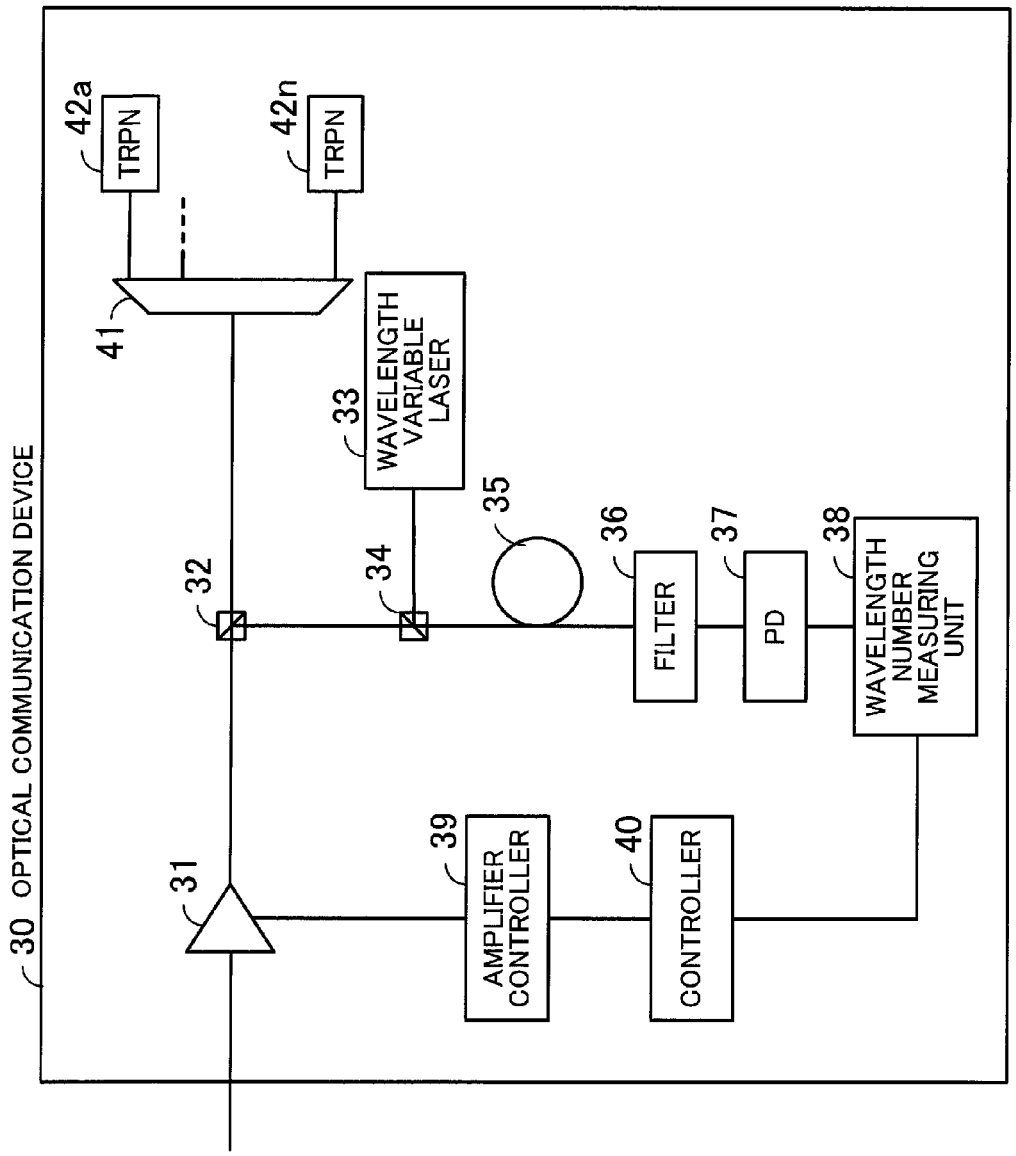
FIG. 4 is a block diagram of an optical communication device on the reception side.

FIG. 4 is a block diagram of an optical communication device on the reception side. FIG. 4 illustrates an optical communication device 30 on the reception side that receives signal light. The optical communication device 30 has an amplifier 31, couplers 32 and 34, a wavelength variable laser 33, an optical medium 35, a filter 36, a Photo Diode (PD) 37, a wavelength number measuring unit 38, an amplifier controller 39, a controller 40, an optical demultiplexer 41, and TRPNs 42a to 42n.

To the amplifier 31, light having propagated through the transmission path is input. That is, to the amplifier 31, signal light that the optical communication device 20 on the transmission side has transmitted is input. The amplifier 31 amplifies the input light and outputs the light to the coupler 32.

To the coupler 32, the light amplified by the amplifier 31 is input. The coupler 32 demultiplexes the input light and outputs the light to the coupler 34 and the optical demultiplexer 41.

The wavelength variable laser 33 outputs, for example, CW light. It is possible for the wavelength variable laser 33 to vary the wavelength of light to be output. In the following, light that the wavelength variable laser 33 outputs is sometimes called wavelength variable light.

To the coupler 34, light output from the coupler 32 and wavelength variable light output from the wavelength variable laser 33 are input. The coupler 34 multiplexes the wavelength variable light output from the wavelength variable laser 33 with the light output from the coupler 32.

The optical medium 35 generates FWM light by light output from the coupler 34. The optical medium 35 is, for example, a DSF (Dispersion Shift Fiber). Alternatively, the optical medium 35 is a highly nonlinear fiber.

The filter 36 transmits light having a predetermined wavelength of the light output from the optical medium 35.

The PD 37 outputs an electric current in accordance with the power of light output from the filter 36.

The wavelength number measuring unit 38 measures the number of wavelengths of the signal light transmitted through the transmission path based on the electric current output from the PD 37.

The amplifier controller 39 performs ALC and AGC (Automatic Gain Control) of the amplifier 31. The amplifier controller 39 performs ALC based on the total power of output of the amplifier 31. Furthermore, the amplifier controller 39 performs AGC based on the light power of input and output of the amplifier 31. The amplifier controller 39 performs ASE correction based on the number of wavelengths of the signal light measured by the wavelength number measuring unit 38 when performing ALC.

The controller 40 performs total control of the optical communication device 30. For example, the controller 40 controls to cause the amplifier controller 39 to start or stop ALC or AGC.

To the optical demultiplexer 41, light output from the coupler 32 is input. The optical demultiplexer 41 demultiplexes the wavelength-multiplexed signal light into signal light for each wavelength and transmits the signal light to the TRPNs 42a to 42n.

The TRPN 42a to TRPN 42n convert the signal light demultiplexed by the optical demultiplexer 41 into an electrical signal.

Note that, it may also be possible to implement the wavelength number measuring unit 38, the amplifier controller 39, and the controller 40 by a processor, a circuit, an FPGA, etc.

ALC is explained.

Figure 5:
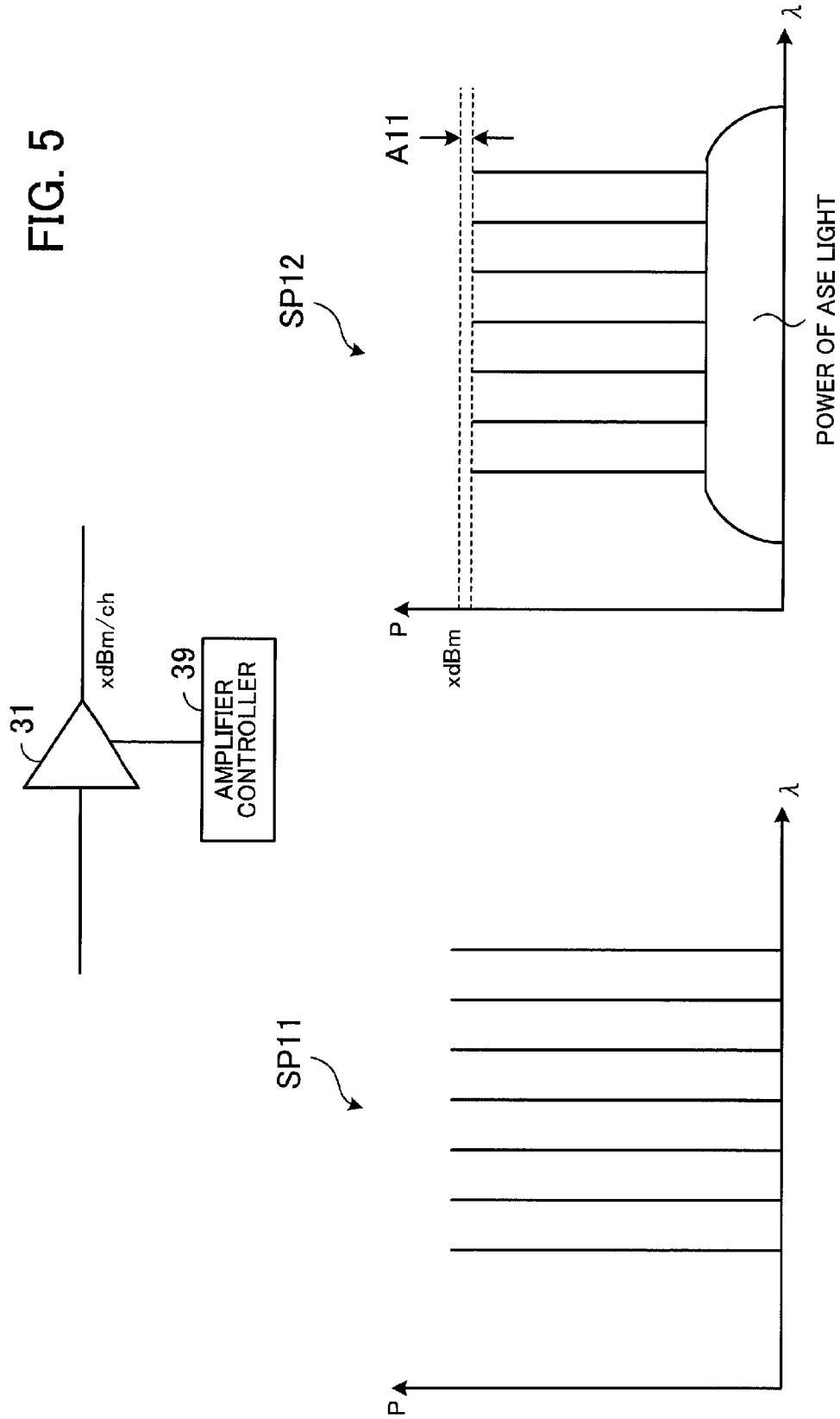
FIG. 5 explains ALC (Part 1)

FIG. 5 is a diagram Part 1 for explaining ALC. FIG. 5 illustrates the amplifier 31 and the amplifier controller 39 illustrated in FIG. 4. Further, FIG. 5 illustrates a spectrum SP11 of the signal light to be input to the amplifier 31. Furthermore, FIG. 5 illustrates a spectrum SP12 of the signal light output from the amplifier 31. To the amplifier 31, wavelength-multiplexed signal light is input as illustrated in the spectrum SP11.

In the amplifier 31, ASE light is generated. Therefore, in the spectrum of the output of the amplifier 31, power of ASE light is included as illustrated in the spectrum SP12.

In the amplifier 31, ALC is performed by the amplifier controller 39. For example, the amplifier 31 has a target to output signal light of x dBm per channel by the control of the amplifier controller 39.

The amplifier controller 39 performs ALC so that the total power of the output of the amplifier 31 is constant. That is, the amplifier controller 39 performs ALC so that the sum of the power of ASE light illustrated in the spectrum SP12 and the power of signal light is constant at a predetermined value. Therefore, the power of the signal light output from the amplifier 31 is reduced lower than the targeted power (x dBm). For example, as illustrated by an arrow A11 of FIG. 5, the power of the signal light decreases lower than the targeted power.

Figure 6:
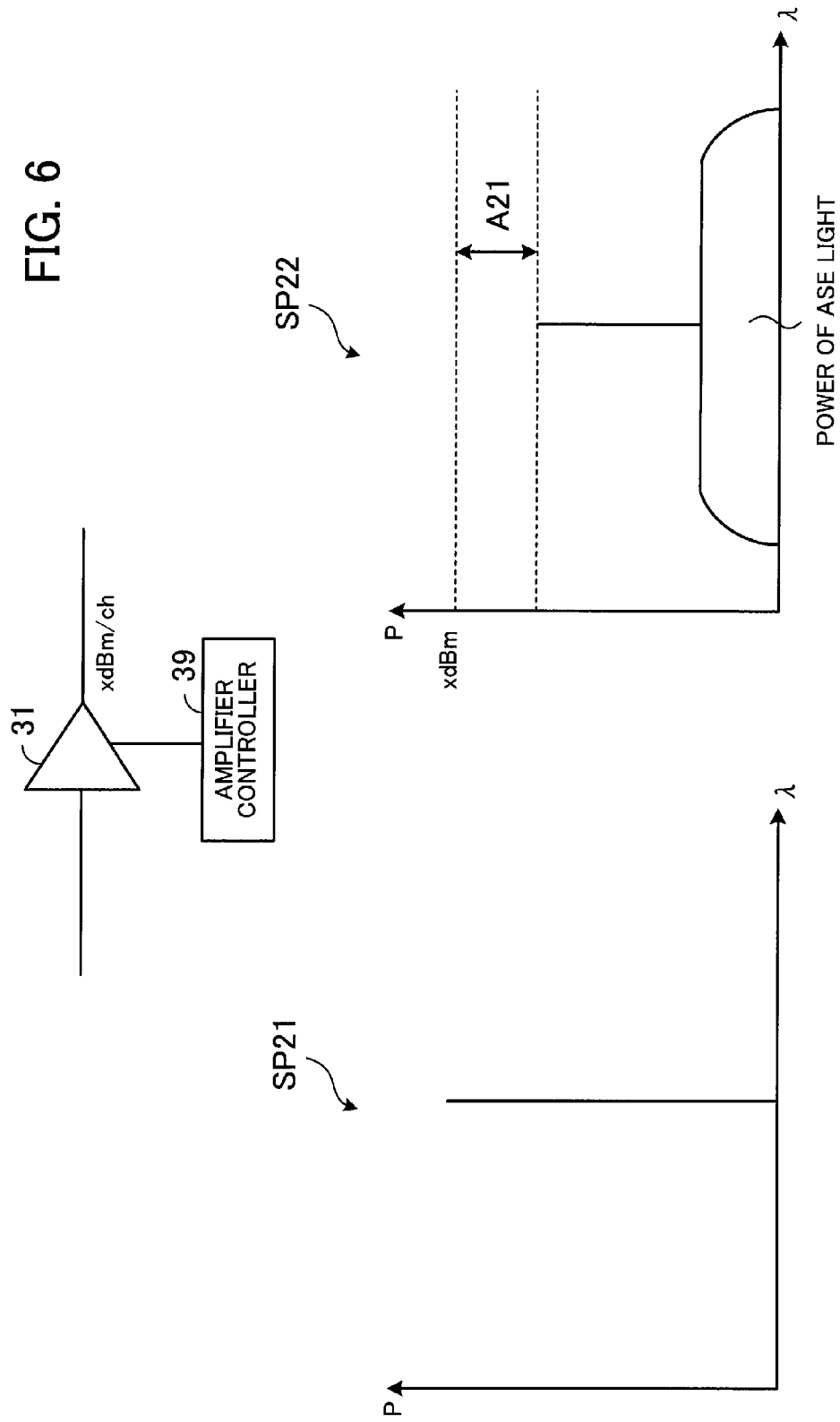
FIG. 6 explains ALC (Part 2)

FIG. 6 is a diagram Part 2 for explaining ALC. FIG. 6 illustrates the amplifier 31 and the amplifier controller 39 illustrated in FIG. 4. Further, FIG. 6 illustrates a spectrum SP21 of the signal light to be input to the amplifier 31. Furthermore, FIG. 6 illustrates a spectrum SP22 of the signal light output from the amplifier 31. In FIG. 6, it is assumed that signal light having a smaller number of wavelengths (one wavelength) than that in FIG. 5 is input.

In the amplifier 31, ASE light is generated. Therefore, in the spectrum of the output of the amplifier 31, power of ASE light is included as illustrated in the spectrum SP22.

In the amplifier 31, ALC is performed by the amplifier controller 39. For example, the amplifier 31 has a target to output signal light of x dBm per channel by the amplifier controller 39.

The amplifier controller 39 performs ALC so that the total power of the output of the amplifier 31 is constant. That is, the amplifier controller 39 performs ALC so that the sum of the power of ASE light illustrated in the spectrum SP22 and the power of signal light is constant at a predetermined value. Therefore, the power of the signal light output from the amplifier 31 decreases lower than the targeted power (x dBm). For example, as illustrated by an arrow A21 of FIG. 6, the power of the signal light decreases lower than the targeted power.

As illustrated in FIG. 6, when the number of wavelengths of the signal light to be amplified is small, the power of ASE light is relatively large compared to the power of the signal light, and therefore, the power of the signal light decreases considerably more than in the case illustrated by the arrow A11 of FIG. 5.

ASE correction is explained. As illustrated in FIGS. 5 and 6, the power of signal light output from the amplifier 31 decreases lower than the desired power due to the number of wavelengths of the signal light. Therefore, the amplifier controller 39 performs ASE correction to make up for the decreased power.

To the amplifier controller 39, the number of wavelengths measured by the wavelength number measuring unit 38 is notified via the controller 40. That is, to the amplifier controller 39, the number of wavelengths of the signal light to be input to the amplifier 31 is input. The amplifier controller 39 increases the power of the signal light to be output from the amplifier 31 by the amount decreased from the desired power based on the number of wavelengths measured by the wavelength number measuring unit 38. That is, the amplifier controller 39 performs ALC so that the power of the signal light is constant at a predetermined value by increasing the power of the output of the amplifier 31 by the amounts indicated by the arrows A11 and A21 illustrated in FIGS. 5 and 6.

The amplifier controller 39 increases the power of the amplifier 31 based on Expression (1) below.

$$ASECOMP(\text{dB}) = 10\log\left(1 + \frac{NFh\nu B_{ASE}}{mP_{sig\_in}}\right) \quad (1)$$

NF in Expression (1) indicates the amplifier noise factor of the amplifier 31, h; Planck's constant, v; the light frequency, $B_{ASE}$; the ASE light band determined by the filter band within the amplifier 31, $P_{sig\_in}$; the power of the input signal light, and m; the number of wavelengths of the signal light to be input to the amplifier 31.

That is, the amplifier controller 39 calculates an ASE correction amount based on Expression (1) and performs ALC so that the power of the signal light of the output of the amplifier 31 is constant at a predetermined value.

Measurement of the number of wavelengths is explained.

FIG. 7 explains a relationship among signal light, wavelength variable light, and FWM light. On the left side of FIG. 7, wavelengths of signal light that may be transmitted in the access network 11 are illustrated. On the right side of FIG. 7, the relationship among the signal light that the optical communication device 30 receives, the wavelength variable light that the wavelength variable laser 33 outputs, and the FWM light that is generated in the optical medium 35 is illustrated.

In the relationship diagram on the right side of FIG. 7, the longitudinal direction represents wavelength and the lateral direction represents time.

It is assumed that the optical communication device 20 on the transmission side illustrated in FIG. 3 transmits, for example, signal light having the wavelengths of Nos. 16, 18, 22, and 26 illustrated on the left side of FIG. 7 as signal light of ch1 to ch4 and that the optical communication device 30 on the reception side illustrated in FIG. 4 receives wavelength-multiplexed signal light of ch1 to ch4.

Symbols x11 to x14 represent the wavelengths of signal light that the optical communication device 20 on the transmission side transmits. That is, the wavelengths x11 to x14 represent the wavelengths of ch1 to ch4.

Symbols y11 to y14 represent wavelengths of wavelength variable light that the wavelength variable laser 33 outputs. Symbols a11 and b11 to b14 represent wavelengths of FWM light output from the optical medium 35.

The filter 36 transmits light having a predetermined wavelength output from the optical medium 35. For example, the filter 36 transmits light having the wavelength a11. Consequently, the PD 37 detects the light having the wavelength a11 indicated by an arrow A31 of FIG. 7.

The wavelength variable laser 33 varies the wavelength of the light to be output. When the wavelength of the light output from the wavelength variable laser 33 reaches the wavelength y11, from the optical medium 35, the FWM light having the wavelengths a11 and b11 is output by the wavelength variable light having the wavelength y11 incident to the optical medium 35 and the signal light having the wavelength x11. From the optical medium 35, the light (FWM light) having the wavelength a11 is output and the light passes through the filter 36 and the monitor 5 detects the light having the wavelength a11.

The wavelength variable laser 33 further varies the wavelength of the light to be output from the wavelength y11. When the wavelength of the light output from the wavelength variable laser 33 reaches the wavelength y12, from the optical medium 35, the FWM light having the wavelengths a11 and b12 is output by the wavelength variable light having the wavelength y12 incident to the optical medium 35 and the signal light having the wavelength x12. From the optical medium 35, the FWM light having the wavelength a11 is output and the light passes through the filter 36 and the PD 37 detects the light having the wavelength a11.

The wavelength variable laser 33 further varies the wavelength of the light to be output from the wavelength y12. When the wavelength of the light output from the wavelength variable laser 33 reaches the wavelength y13, from the optical medium 35, the FWM light having the wavelengths a11 and b13 is output by the wavelength variable light having the wavelength y13 incident to the optical medium 35 and the signal light having the wavelength x13. From the optical medium 35, the FWM light having the wavelength a11 is output and the light passes through the filter 36 and the PD 37 detects the light having the wavelength a11.

The wavelength variable laser 33 further varies the wavelength of the light to be output from the wavelength y13. When the wavelength of the light output from the wavelength variable laser 33 reaches the wavelength y14, from the optical medium 35, the FWM light having the wavelengths a11 and b14 is output by the wavelength variable light having the wavelength y14 incident to the optical medium 35 and the signal light having the wavelength x14. From the optical medium 35, the FWM light having the wavelength a11 is output and the light passes through the filter 36 and the PD 37 detects the light having the wavelength a11.

The wavelength number measuring unit 38 measures the number of wavelengths of the signal light that the optical communication device 20 on the transmission side transmits by, for example, the number of beams of light having the wavelength a11 detected by the PD 37. For example, in the example described above, the PD 37 detects four beams of FWM light, and therefore, it is possible for the wavelength number measuring unit 38 to measure that the signal light having four wavelengths is transmitted from the optical communication device 20 on the transmission side.

The measured number of wavelengths is notified to the amplifier controller 39 via the controller 40. The amplifier controller 39 calculates the ASE correction amount based on the number of wavelengths output from the wavelength number measuring unit 38 and performs ALC so that the power of the signal light of the output of the amplifier 31 is constant at a predetermined value.

Note that, when the ch (channel) of the signal light that may be transmitted is known, the wavelength variable laser 33 sweeps the wavelengths of the light to be output by the amount by which the number of wavelengths of the ch may be detected. For example, it is assumed that from the optical communication device 20 on the transmission side, the signal light of the ch1 to ch4 illustrated on the left side of FIG. 7 may be transmitted. In this case, it is only necessary for the wavelength variable laser 33 to sweep the wavelengths of No. 9 to No. 14 illustrated in FIG. 7. Then, when the wavelengths of the light that the wavelength variable laser 33 outputs are, for example, those of No. 10 (y12) and No. 12 (y13) and if the FWM light is detected by the PD 37, it is possible for the wavelength number measuring unit 38 to measure that the signal light having two wavelengths is transmitted.

Further, it may also be possible for the wavelength variable laser 33 to output light by, for example, continuously sweeping the wavelengths of No. 1 to No. 40. Furthermore, it may also be possible for the wavelength variable laser 33 to output light by, for example, switching the wavelengths of No. 1 to No. 40, respectively. If the wavelength variable laser 33 is of semiconductor integrated type, it is possible to output light by, for example, switching the respective wavelengths of No. 1 to No. 40 at intervals of several microseconds.

Wavelength number measurement of the wavelength number measuring unit 38 is explained. First, examples of parameters for the wavelength number measuring unit 38 to measure the number of wavelengths are explained.

Figure 8:
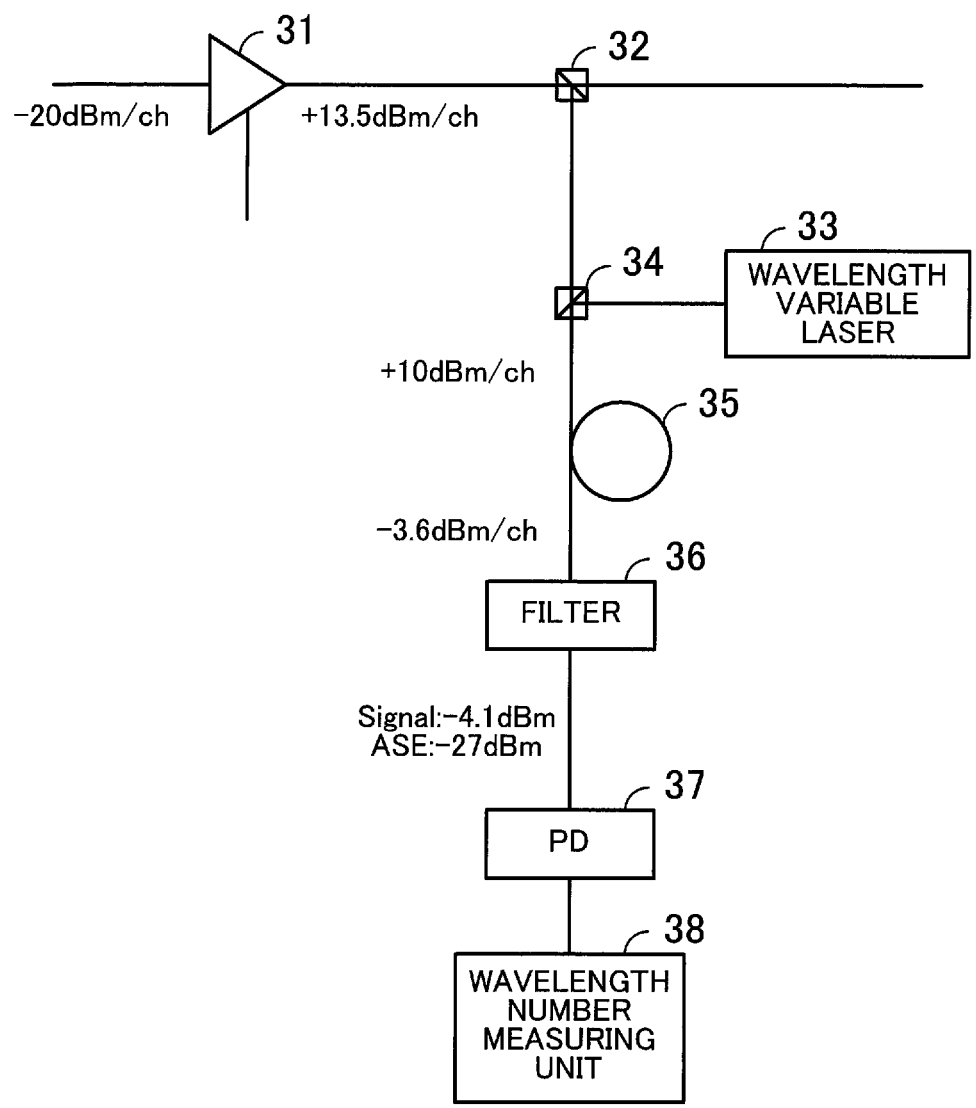
FIG. 8 illustrates examples of parameters for wavelength number measurement.

FIG. 8 illustrates examples of parameters for wavelength number measurement. In FIG. 8, the same symbols are attached to the same components as those of FIG. 4 and explanation thereof is omitted.

As illustrated in FIG. 8, it is assumed that to the amplifier 31, signal light of −20 dBm/ch is input and that the amplifier 31 amplifies signal light to be input and from the amplifier 31, signal light of +13.5 dBm/ch is output.

It is assumed that: from the coupler 34, signal light of +10 dBm/ch is output; from the optical medium 35, signal light of −3.6 dBm/ch is output; the average zero dispersion wavelength, the zero dispersion wavelength standard deviation, and the dispersion slope of the optical medium 35 are 1,550 nm, 6.24 nm, and 0.0695, respectively; and the loss coefficient, the effective sectional area, the refractive index, and the nonlinear refractive index of the optical medium 35 are 0.17 dB/km, 49 µm$^2$, 1.45, and 3.00×10$^{-20}$ m$^2$/W, respectively.

For example, when the FWM light having a wavelength a is output from the optical medium 35, from the filter 36, light of −4.1 dBm is output. For example, when the FWM light having the wavelength a is not output from the optical medium 35, from the filter 36, light (ASE light) of −27 dBm is output.

FIG. 9 explains wavelength number measurement and ch1 to ch4 illustrated in the row of signal light of FIG. 9 correspond to ch1 to ch4 illustrated in FIG. 7. "Presence" and "Absence" illustrated in the row of Signal light presence/absence represent a case where signal light of each ch is transmitted and a case where not, respectively.

The row of Polarization parallel indicates the power of the FWM light output from the optical medium 35 when the polarization state of light output from the wavelength variable laser 33 is parallel to the signal light. The row of Polarization orthogonal indicates the power of the FWM light output from the optical medium 35 when the polarization state of light output from the wavelength variable laser 33 is orthogonal to the signal light. Note that, in the row of Polarization parallel and the row of Polarization orthogonal, the ASE light that is generated in the amplifier 31 is not taken into consideration.

Polarization parallel+ASE and Polarization orthogonal+ASE represent the power of the FWM light when the ASE light of the amplifier 31 is taken into consideration. That is, the two rows indicate the power of light to be input to the PD 37. For example, it is assumed that from the optical communication device 20 on the transmission side, the signal light of ch2 is transmitted and from the wavelength variable laser 33, light the polarization state of which is parallel to the signal light of ch2 is output. In this case, to the PD 37, light of −15.6 dBm is input. Further, when the signal light of ch2 is not transmitted from the optical communication device 20 on the transmission side, to the PD 37, light of −27.0 dBm is input.

The row of On/off ratio indicates a ratio of signal light in a case where signal light is transmitted from the optical communication device 20 on the transmission side and a case where not transmitted. The row of On/off ratio indicates a ratio of the signal light in Polarization orthogonal+ASE (ratio when the condition of on/off ratio is worse). For example, in the case of ch2, the power of light input to the PD 37 at the on time is −18.3 dBm and the power of light input to the PD 37 at the off time is −27.0 dBm. Consequently, On/off ratio of ch2 is 8.7 dB.

The row of Determination threshold value indicates an example of a threshold value by which the wavelength number measuring unit 38 determines that the FWM light is generated in the optical medium 35. For example, it is assumed that Determination threshold value is −20.0 dBm as illustrated in FIG. 9.

The row of Determination result indicates the determination result of the FWM light of the wavelength number measuring unit 38. For example, it is assumed that the power '−18.3 dBm' of FWM light is detected in the PD 37. That is, it is assumed that the FWM light of ch2 is detected. In this case, the value is larger than the determination threshold value −20 dBm, and therefore, the wavelength number measuring unit 38 determines 'on' (signal light present).

It is possible for the wavelength number measuring unit 38 to count the number of wavelengths of the signal light transmitted from the optical communication device 20 on the transmission side by counting the beams of FWM light exceeding the determination threshold value −20.0 while the wavelength variable laser 33 varies the wavelength. For example, it is assumed that the wavelength variable laser 33 varies the wavelength from 1,535.04 (y11) to 1,538.98 (y14) and that the wavelength number measuring unit 38 counts four beams of FWM light exceeding the determination threshold value −20.0 in the meanwhile. In this case, the wavelength number measuring unit 38 measures that the signal light having four wavelengths is transmitted from the optical communication device 20 on the transmission side.

Figure 10:
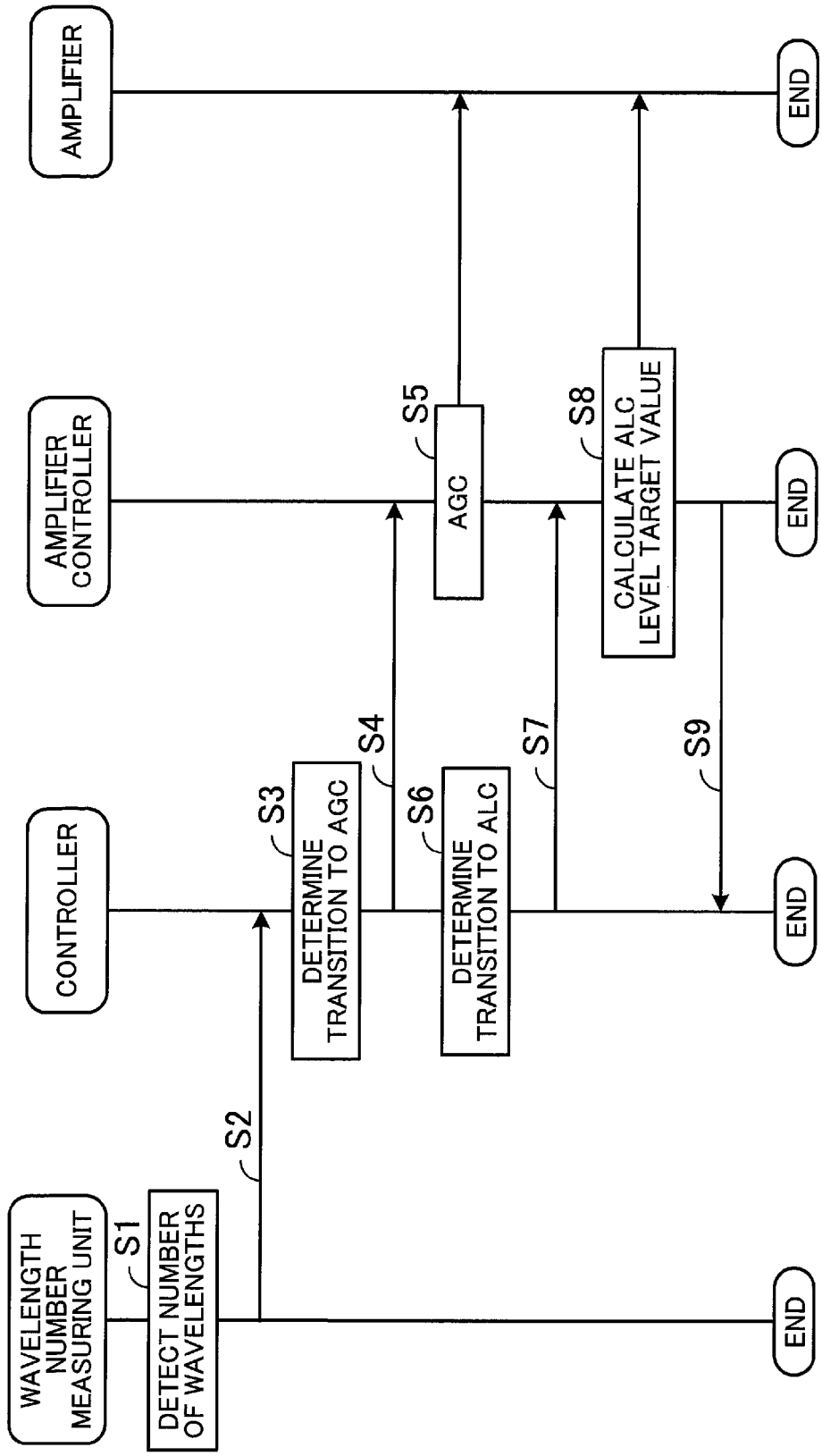
FIG. 10 illustrates an operation sequence of an optical communication device when the number of wavelengths is increased.

FIG. 10 illustrates the operation sequence of the optical communication device when the number of wavelengths is increased. The amplifier controller 39 of the optical communication device 30 operates under ALC except when the signal light is being increased or decreased in the number of wavelengths. The amplifier controller 39 monitors the output of the amplifier 31 and performs level adjustment for the level target set value in accordance with the amplifier time constant (sec/dB). For example, it is assumed that the level target set value of the amplifier 31 is +2 dBm/ch. When the number of wavelengths is n, the amplifier controller 39 performs ALC so that the output of the amplifier 31 is $+2+10 \log_{10} (n)$ dBm (level target set value).

Note that, in the following, it is assumed that at the output of the TRPNs 21a to 21n of the optical communication device 20 on the transmission side, a VOA (Variable Optical Attenuator) is arranged and the number of wavelengths is decreased by the opening and closing of the VOA. Consequently, it is assumed that a steep rise or a drop (hundreds of microseconds or less) of the level of signal light does not occur.

It is assumed that the number of wavelengths of signal light is increased. For example, it is assumed that the number of wavelengths is increased from one to two. The optical communication device 30 performs processing illustrated in the following steps.

(Step S1) The wavelength number measuring unit 38 measures the number of wavelengths 2.

(Step S2) The wavelength number measuring unit 38 notifies the controller 40 of the measured number of wavelengths 2.

(Step S3) The controller 40 determines the transition from ALC to AGC.

(Step S4) The controller 40 instructs the amplifier controller 39 to make transition to AGC.

(Step S5) The amplifier controller 39 performs AGC for the amplifier 31.

(Step S6) The controller 40 determines the transition to ALC after the transition instruction to AGC at step S4.

(Step S7) The controller 40 instructs the amplifier controller 39 to make transition to ALC.

(Step S8) The amplifier controller 39 performs ALC for the amplifier 31. At this time, the amplifier controller 39 calculates the level target set value of ALC taking into consideration the ASE correction amount in accordance with the number of wavelengths and performs ALC.

(Step S9) The amplifier controller 39 notifies the controller 40 of that the output of the amplifier 31 has reached the level target set value. Note that, the amplifier controller 39 performs ALC also after this so that the output of the amplifier 31 reaches the level target set value. At this time, the amplifier controller 39 takes the ASE correction amount into consideration.

Figure 11:
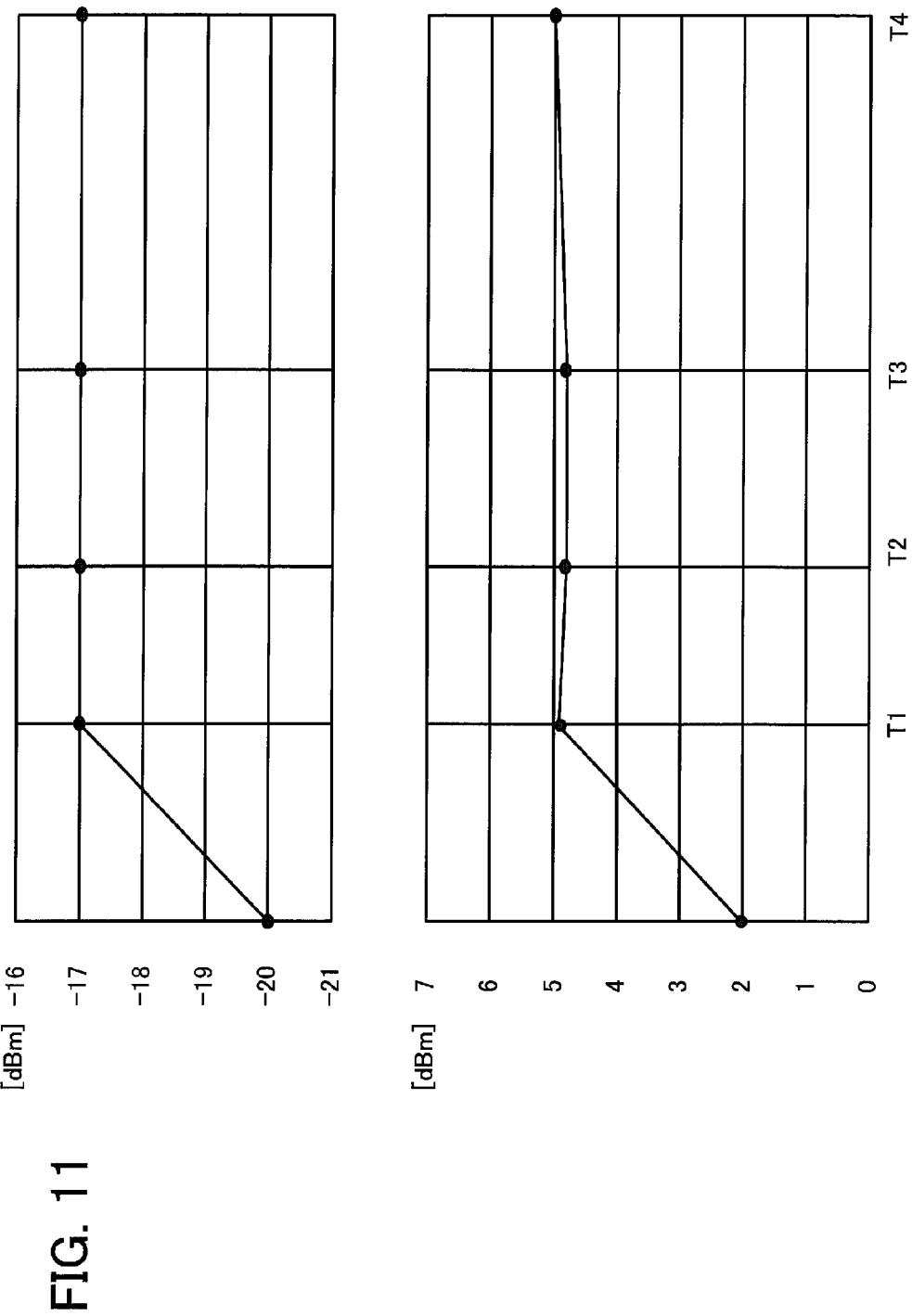
FIG. 11 illustrates an input power and an output power of an amplifier when the number of wavelengths is increased.

FIG. 11 illustrates the input power and the output power of the amplifier when the number of wavelengths is increased. The upper diagram of FIG. 11 illustrates the input power of the amplifier 31. The lower diagram of FIG. 11 illustrates the output power of the amplifier 31. The vertical axis represents the total power of the input and the output of the amplifier 31 and the horizontal axis represents time.

The interval between time 0 and time T1 illustrated in FIG. 11 indicates the time necessary to increase the number of wavelengths. The time T1 indicates the time when the increment of the number of wavelengths is completed.

The interval between the time T1 and time T2 indicates the time taken for the wavelength number measuring unit 38 to measure the number of wavelengths. The time T2 indicates the time when the measurement of the number of wavelengths is completed and transition is made to AGC. For example, the time T2 indicates the time when the amplifier controller 39 starts AGC at step S5 of FIG. 10.

The interval between the time T2 and time T3 indicates the time necessary to calculate the level target set value of ALC. Further, the interval between the time T2 and time T3 indicates the period of time during which the amplifier controller 39 is performing AGC. For example, the interval between the time T2 and time T3 indicates the period of time during which the amplifier controller 39 receives an instruction to make transition to ALC at step S7 of FIG. 10 and calculates the level target set value of ALC at step S8.

The time T3 indicates the time when the amplifier controller 39 starts ALC. The time interval between the time T3 and time T4 indicates the time taken for the output of the amplifier 31 to reach the level target set value.

The time T4 indicates the time when the output of the amplifier 31 has reached the level target set value. The time T4 corresponds to, for example, the time when the amplifier controller 39 gives notification to the controller 40 at step S9 of FIG. 10.

Figure 12:
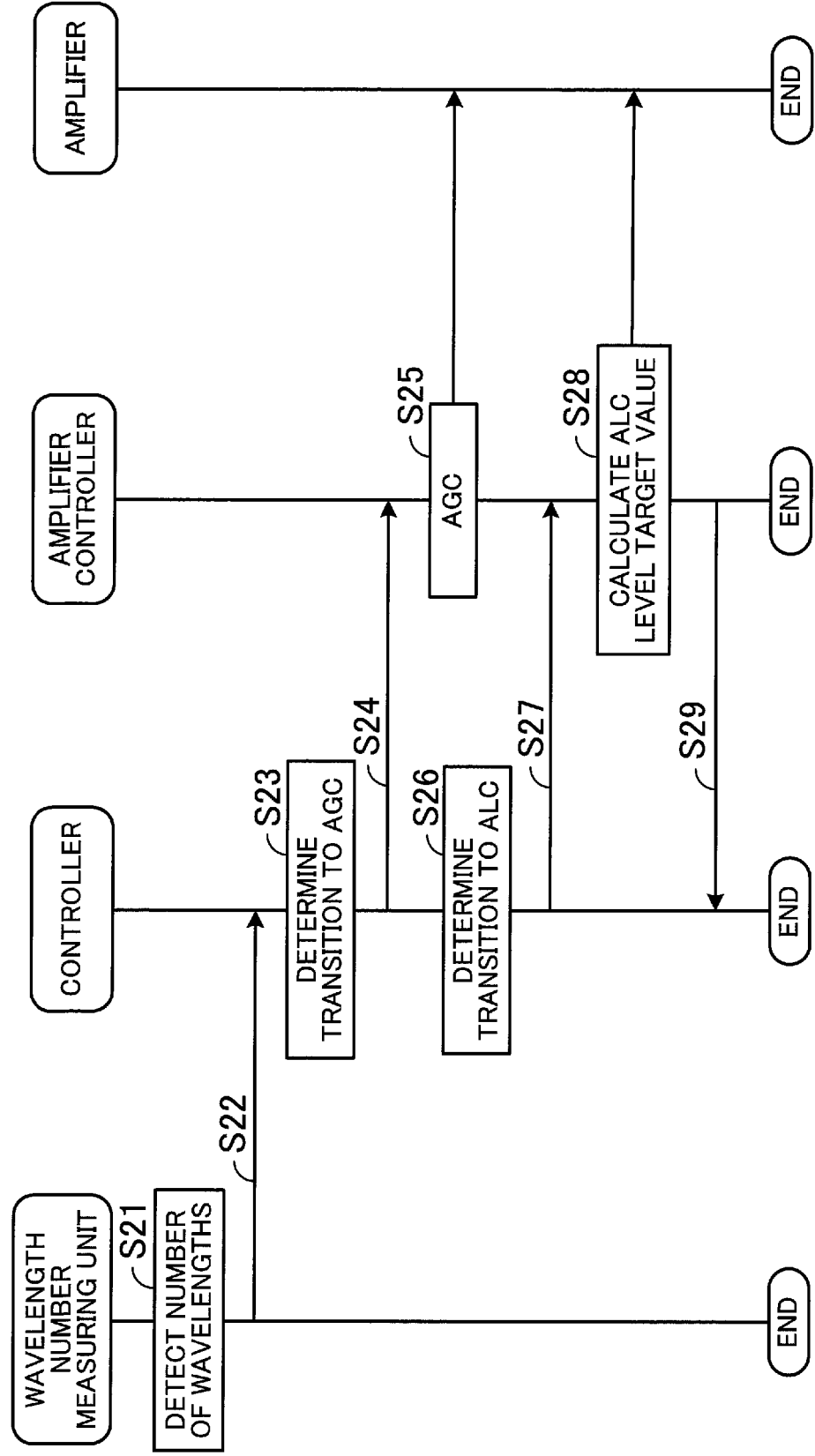
FIG. 12 illustrates an operation sequence of an optical communication device when the number of wavelengths is decreased.

FIG. 12 illustrates the operation sequence of the optical communication device when the number of wavelengths is decreased. It is assumed that the number of wavelengths of signal light is decreased. For example, it is assumed that the number of wavelengths is decreased from two to one. The optical communication device 30 performs processing illustrated in the following steps.

(Step S21) The wavelength number measuring unit 38 measures the number of wavelengths 1.

(Step S22) The wavelength number measuring unit 38 notifies the controller 40 of the measured number of wavelengths 1.

(Step S23) The controller 40 determines transition from ALC to AGC.

(Step S24) The controller 40 instructs the amplifier controller 39 to make transition to AGC.

(Step S25) The amplifier controller 39 performs AGC for the amplifier 31.

(Step S26) The controller 40 determines transition to ALC after the transition instruction to AGC at step S24.

(Step S27) The controller 40 instructs the amplifier controller 39 to make transition to ALC.

(Step S28) The amplifier controller 39 performs ALC for the amplifier 31. At this time, the amplifier controller 39 calculates the level target set value of ALC taking into consideration the ASE correction amount in accordance with the number of wavelengths and performs ALC.

(Step S29) The amplifier controller 39 notifies the controller 40 of that the output of the amplifier 31 has reached the level target set value. The amplifier controller 39 performs ALC also after this so that the output of the amplifier 31 reaches the level target set value. At this time, the amplifier controller 39 takes the ASE correction amount into consideration.

Figure 13:
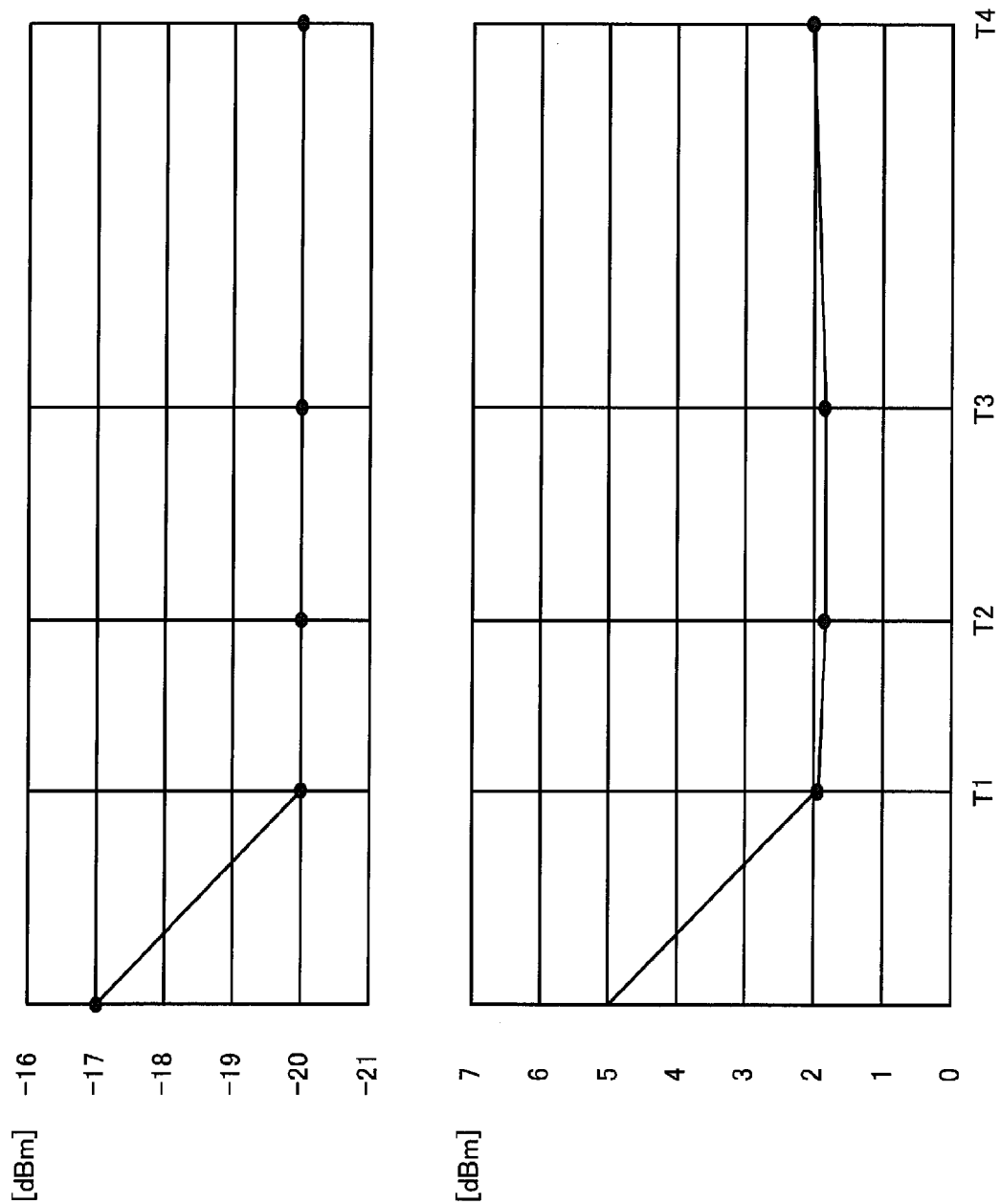
FIG. 13 illustrates an input power and an output power of an amplifier when the number of wavelengths is decreased.

FIG. 13 illustrates the input power and the output power of the amplifier when the number of wavelengths is decreased. The upper diagram of FIG. 13 illustrates the input power of the amplifier 31. The lower diagram of FIG. 13 illustrates the output power of the amplifier 31. The vertical axis represents the total power of the input and the output of the amplifier 31 and the horizontal axis represents time.

The interval between the time 0 and time T1 illustrated in FIG. 13 indicates the time necessary to decrease the number of wavelengths. The time T1 indicates the time when the decrement of the number of wavelengths is completed.

The interval between the time T1 and time T2 indicates the time necessary for the wavelength number measuring unit 38 to measure the number of wavelengths. The time T2 indicates the time when the measurement of the number of wavelengths is completed and transition is made to AGC. For example, the time T2 indicates the time when the amplifier controller 39 starts AGC at step S25 of FIG. 12.

The interval between the time T2 and T3 indicates the time necessary to calculate the level target set value of ALC. Further, the interval between the time T2 and T3 indicates the period of time during which the amplifier controller 39 is performing AGC. For example, the interval between the time T2 and T3 indicates the time of period during which the amplifier controller 39 receives the instruction to make transition to ALC at step S27 of FIG. 12 and calculates the level target set value of ALC at step S28.

The time T3 indicates the time when the amplifier controller 39 starts ALC. The interval between the time T3 and T4 indicates the time taken for the output of the amplifier 31 to reach the level target set value.

The time T4 indicates the time when the output of the amplifier 31 has reached the level target set value. The time T4 corresponds to, for example, the time when the amplifier controller 39 gives notification to the controller 40 at step S29 of FIG. 12.

As described above, the optical communication device 30 causes the light received from the transmission path and the wavelength variable light to enter the optical medium 35 in which the FWM light is generated and monitors the FWM light having a predetermined wavelength output from the optical medium 35. Then, the optical communication device 30 is caused to measure the number of wavelengths of the signal light transmitted through the transmission path based on the result of monitoring of the FWM light.

Due to this, it is possible for the optical communication device 30 to know the number of wavelengths of signal light to be received even if information of the number of wavelengths is not notified from the optical communication device 20 on the transmission side and to perform, for example, ALC and ASE correction. That is, it is not necessary for the optical communication device 20 on the transmission side to include a device to transmit information of the number of wavelengths, such as an OSC, and therefore, it is possible to reduce the cost of the optical transmission system.

Note that, in the above, the optical communication device on the transmission side and that on the reception side are explained separately, but it is also possible to cause one optical communication device to transmit and receive signal light. For example, the optical communication device 30 illustrated in FIG. 4 may have the TRPNs 21a to 21n and the optical multiplexer 22 illustrated in FIG. 3.

Further, it is also possible for the optical communication device 30 to measure the wavelength of the signal light propagating through the transmission path. For example, it is possible for the wavelength number measuring unit 38 to measure the wavelength of signal light based on the presence/absence of the FWM light having a predetermined wavelength and the wavelength of light that the wavelength variable laser 33 outputs. For example, it is assumed that light having the wavelength a11 illustrated in FIG. 7 is detected in the PD 37 and at this time, light having the wavelength y12 is output from the wavelength variable laser 33. In this case, it is possible for the wavelength number measuring unit 38 to measure that the signal light having the wavelength x12 is propagating through the transmission path.

Further, it is possible for the optical communication device 30 to suppress deterioration of the transmission performance by performing ASE correction based on the measured number of wavelengths of signal light. For example, as described above, when the number of wavelengths of the transmitted signal light is small, the signal light tends to deteriorate, but it is possible for the optical communication device 30 to perform ASE correction based on the measured number of wavelengths of the signal light, and therefore, it is possible to suppress deterioration of the signal light.

Third Embodiment

Next, a third embodiment is explained in detail with reference to the drawings. In the second embodiment, the wavelength number measuring unit 38 notifies the controller 40 of the measured number of wavelengths, but in the third embodiment notifies the amplifier controller 39 thereof.

Figure 14:
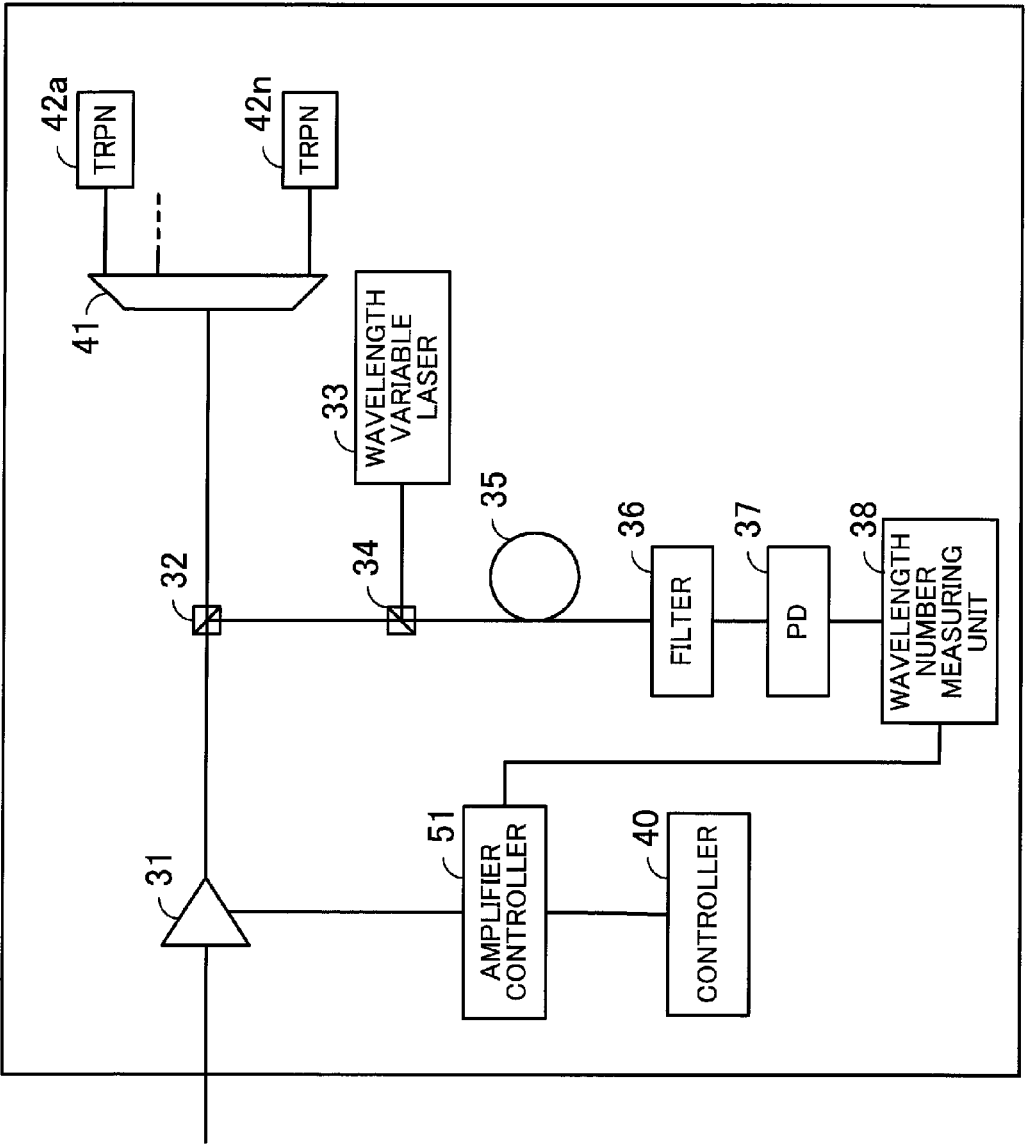
FIG. 14 is a block diagram of an optical communication device on the reception side according to a third embodiment.

FIG. 14 is a block diagram of an optical communication device on the reception side according to the third embodiment. In FIG. 14, the same symbols are attached to the same components as those of FIG. 4. In FIG. 14, the number of wavelengths measured in the wavelength number measuring unit 38 is output to an amplifier controller 51. The amplifier controller 51 performs ALC and AGC based on the number of wavelengths output from the wavelength number measuring unit 38.

Figure 15:
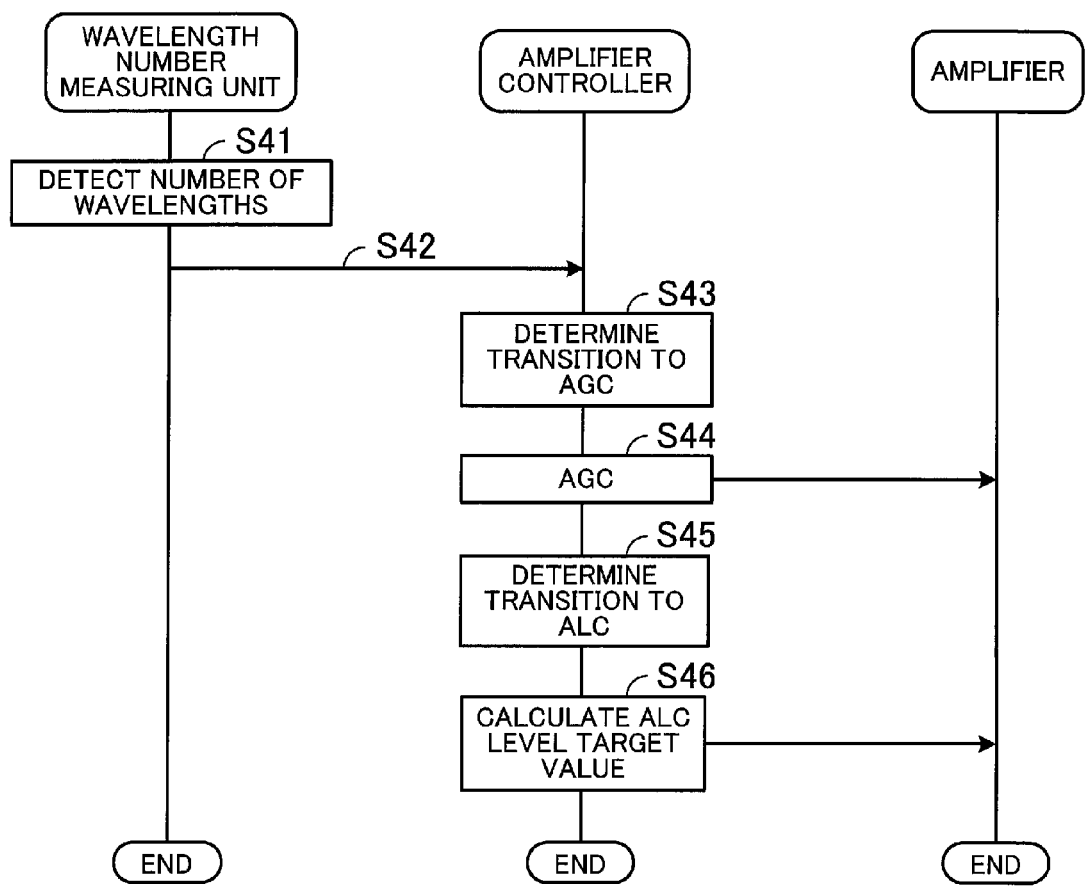
FIG. 15 illustrates an operation sequence of an optical communication device when the number of wavelengths is increased.

FIG. 15 illustrates the operation sequence of the optical communication device when the number of wavelengths is increased. It is assumed that the number of wavelengths of signal light is increased. For example, it is assumed that the number of wavelengths is increased from one to two. The optical communication device 30 performs processing illustrated in the following steps.

(Step S41) The wavelength number measuring unit 38 measures the number of wavelengths 2.

(Step S42) The wavelength number measuring unit 38 notifies the amplifier controller 51 of the measured number of wavelengths 2.

(Step S43) The amplifier controller 51 determines transition from ALC to AGC.

(Step S44) The amplifier controller 51 performs AGC for the amplifier 31.

(Step S45) The amplifier controller 51 determines transition from AGC to ALC.

(Step S46) The amplifier controller 51 performs ALC for the amplifier 31. At this time, the amplifier controller 51 calculates the level target set value of ALC taking into consideration the ASE correction amount in accordance with the number of wavelengths and performs ALC.

After that, the amplifier controller 51 performs ALC so that the output of the amplifier 31 reaches the level target set value. That is, when the output of the amplifier 31 deviates from the level target set value, the amplifier controller 51 performs ALC so that the output of the amplifier 31 reaches the level target set value. Note that, when the number of wavelengths is decreased, the optical communication device also performs the same processing as that of the sequence illustrated in FIG. 15. Explanation thereof is omitted.

As above, it is designed so that the wavelength number measuring unit 38 notifies the amplifier controller 51 of the measured number of wavelengths. Also in this case, it is possible for the optical communication device 30 to know the number of wavelengths of signal light to be received even if the information of the number of wavelengths is not notified from the optical communication device 20 on the transmission side to perform, for example, ALC and ASE correction.

That is, it is not necessary for the optical communication device 20 on the transmission side to include a device to transmit information of the number of wavelengths, such as an OSC, and therefore, it is possible to reduce the cost of the optical transmission system.

Fourth Embodiment

Next, a fourth embodiment is explained in detail with reference to the drawings. In the second embodiment, the amplifier controller 39 makes transition to AGC when the number of wavelengths is increased or decreased. In the fourth embodiment, transition to AGC is not made but the level target setting of ALC is performed. The optical communication device according to the fourth embodiment is the same as that of FIG. 4 and explanation of the block diagram thereof is omitted. However, the controller 40 and the amplifier controller 39 according to the fourth embodiment do not perform transition processing to AGC.

Figure 16:
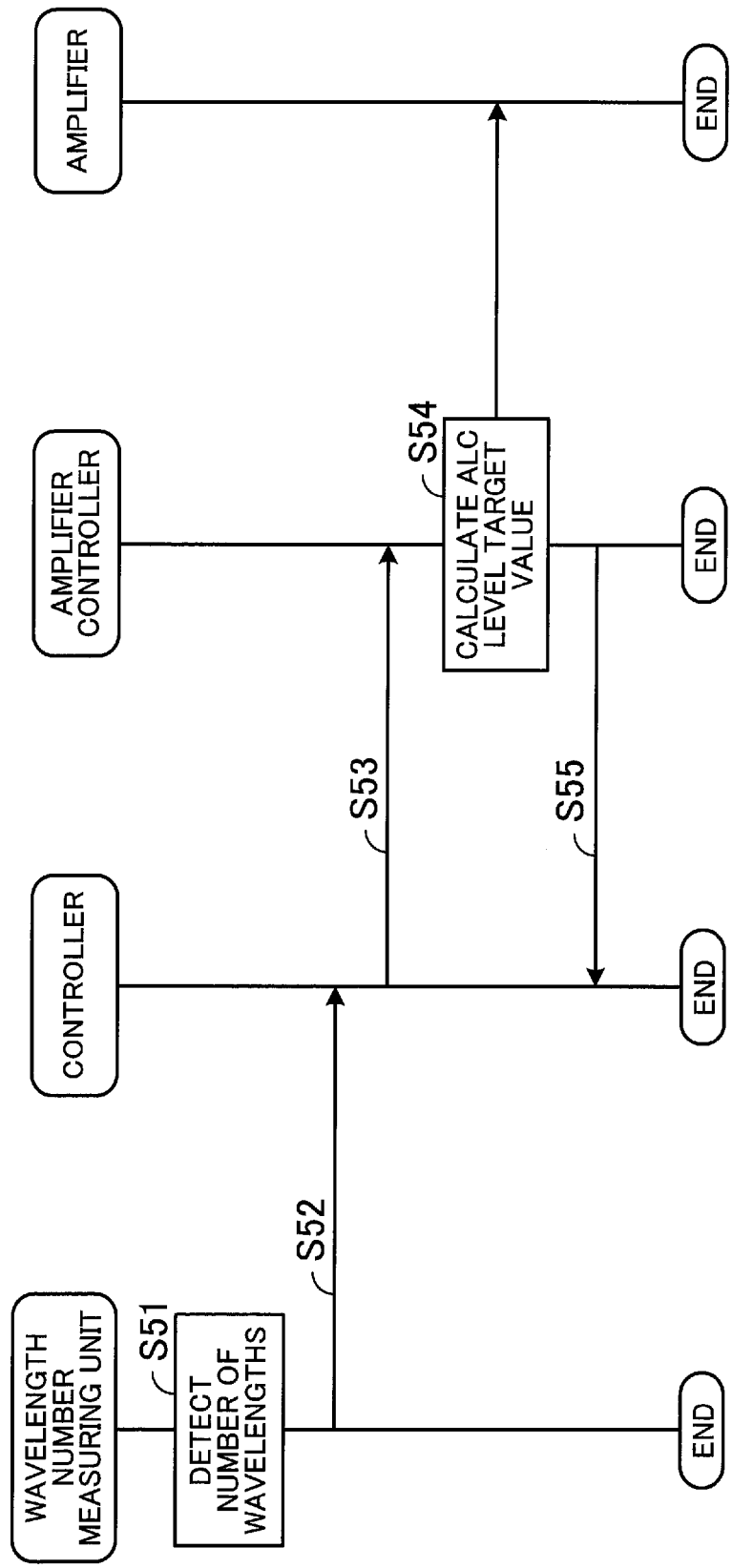
FIG. 16 illustrates an operation sequence of an optical communication device when the number of wavelengths is increased according to a fourth embodiment.

FIG. 16 illustrates the operation sequence of the optical communication device when the number of wavelengths is increased according to the fourth embodiment. It is assumed that the number of wavelengths of signal light is increased. For example, it is assumed that the number of wavelengths is increased from one to two. The optical communication device 30 performs processing illustrated in the following steps.

(Step S51) The wavelength number measuring unit 38 measures the number of wavelengths 2.

(Step S52) The wavelength number measuring unit 38 notifies the controller 40 of the measured number of wavelengths 2.

(Step S53) The controller 40 notifies the amplifier controller 39 of the number of wavelengths notified from the wavelength number measuring unit 38.

(Step S54) The amplifier controller 39 performs ALC with the new number of wavelengths for the amplifier 31. At this time, the amplifier controller 39 calculates the level target set value of ALC taking into consideration the ASE correction amount in accordance with the number of wavelengths and performs ALC.

(Step S55) The amplifier controller 39 notifies the controller 40 of that the output of the amplifier 31 has reached the level target set value. Note that, the amplifier controller 39 performs ALC also after this so that the output of the amplifier 31 reaches the level target set value. At this time, the amplifier controller 39 takes the ASE correction amount into consideration.

Figure 17:
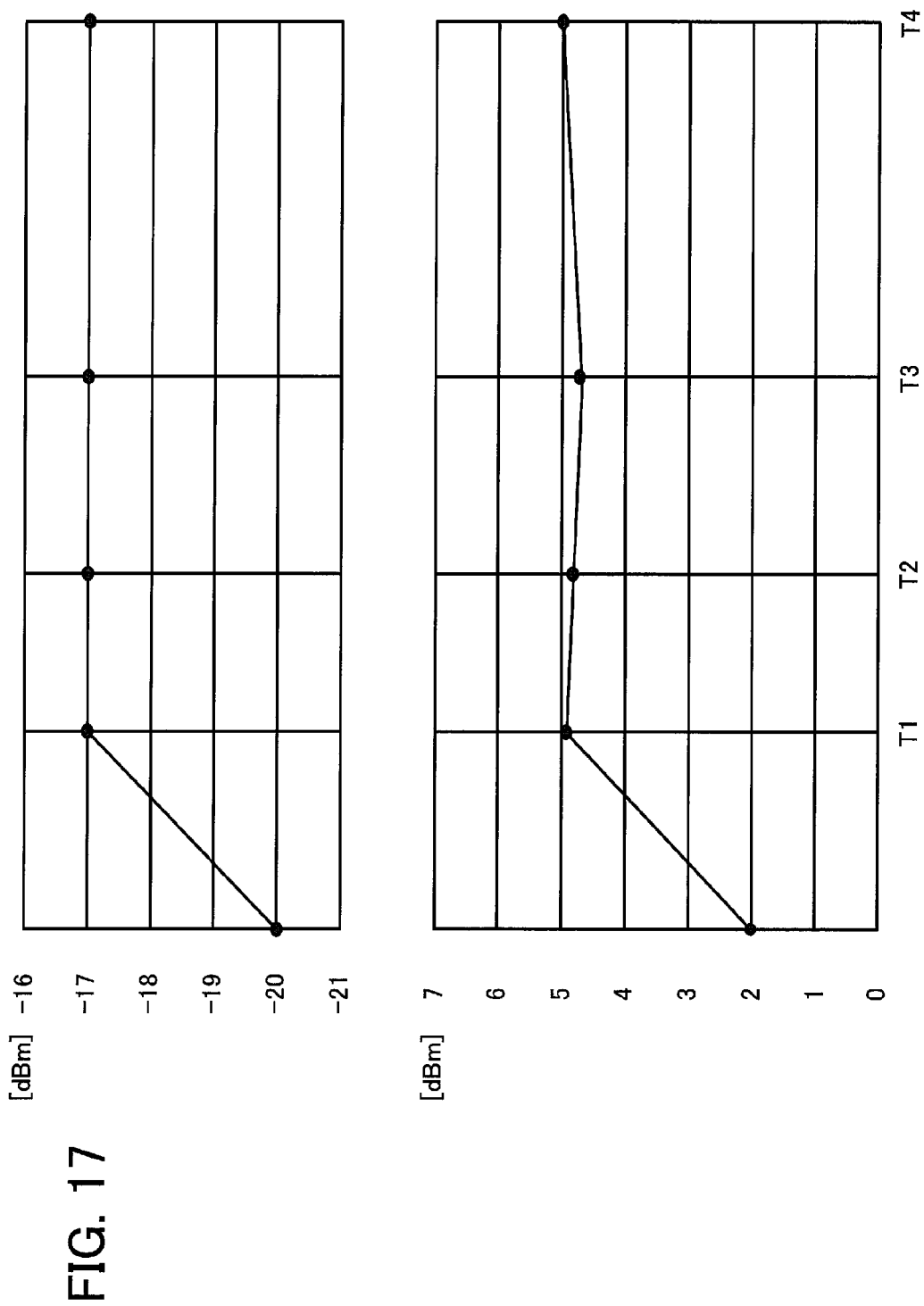
FIG. 17 illustrates an input power and an output power of an amplifier when the number of wavelengths is increased.

FIG. 17 illustrates the input power and the output power of the amplifier when the number of wavelengths is increased. The upper diagram of FIG. 17 illustrates the input power of the amplifier 31. The lower diagram of FIG. 17 illustrates the output power of the amplifier 31. The vertical axis represents the total power of the input and the output of the amplifier 31 and the horizontal axis represents time.

The interval between the time 0 and time T1 illustrated in FIG. 17 indicates the time necessary to increase the number of wavelengths. The time T1 indicates the time when the increment of the number of wavelengths is completed.

The interval between the time T1 and time T2 indicates the time taken for the wavelength number measuring unit 38 to measure the number of wavelengths. The time T2 indicates the time when the measurement of the number of wavelengths is completed and calculation of the level target set value is started.

The interval between the time T2 and T3 indicates the time necessary to calculate the level target set value of ALC. For example, the interval between the time T2 and T3 indicates the period of time during which the amplifier controller 39 calculates the level target set value at step S54 of FIG. 16.

The time T3 indicates the time when the amplifier controller 39 starts ALC. The interval between the time T3 and T4 indicates the time taken for the output of the amplifier 31 to reach the level target set value.

The time T4 indicates the time when the output of the amplifier 31 has reached the level target set value. The time T4 corresponds to, for example, the time when the amplifier controller 39 gives notification to the controller 40 at step S55 of FIG. 16.

Note that, the operation of the optical communication device 30 is simplified because AGC is not performed. On the other hand, the optical communication device 30 continues to operate under ALC also during the period of the AGC operation, and therefore, the time taken for the updated level target set value to be reached after the update is lengthened compared to the case where the AGC operation is performed. For example, the time interval between the time T3 and T4 illustrated in FIG. 17 is longer than the interval between the time T3 and T4 illustrated in FIG. 11.

Figure 18:
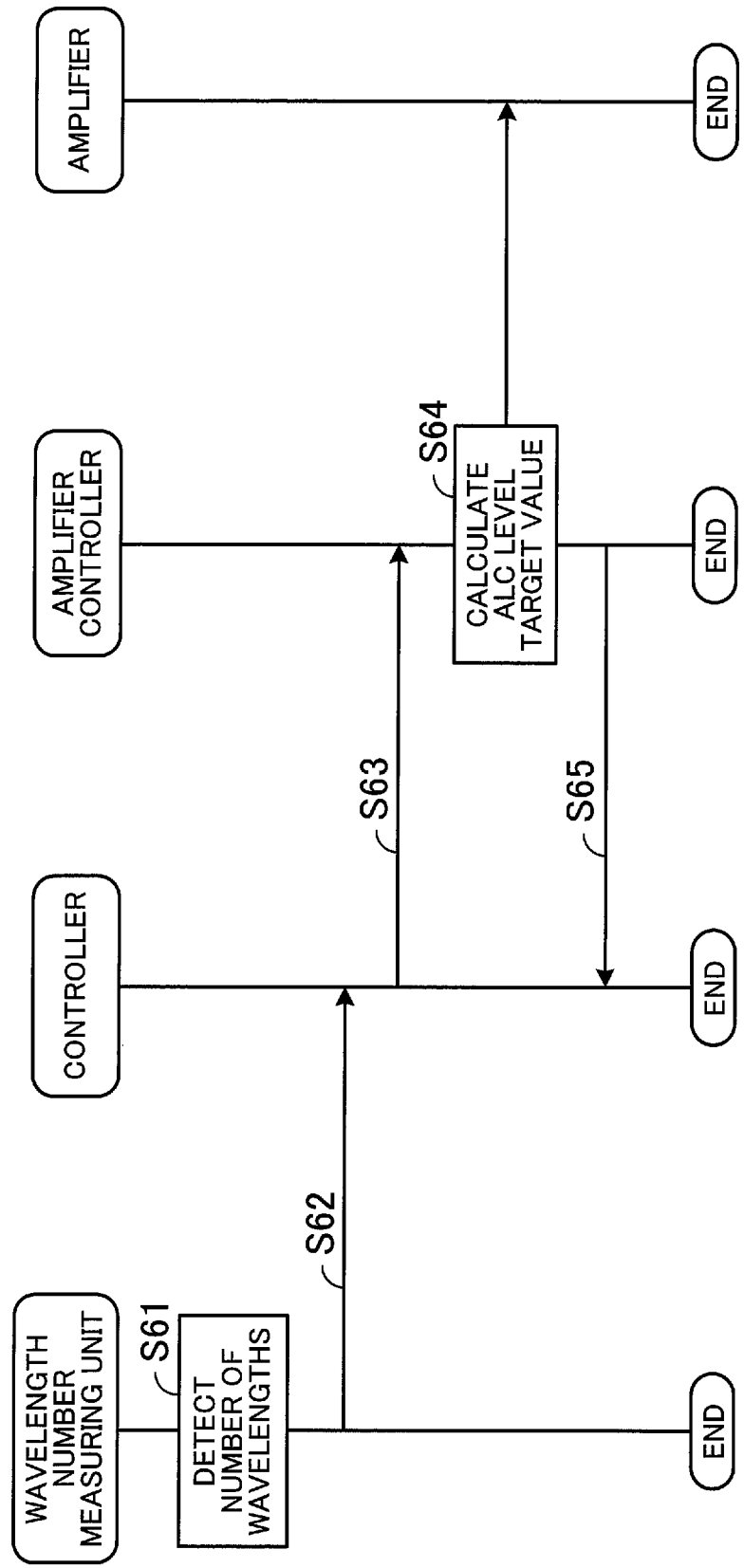
FIG. 18 illustrates an operation sequence of an optical communication device when the number of wavelengths is decreased.

FIG. 18 illustrates the operation sequence of the optical communication device when the number of wavelengths is decreased. It is assumed that the number of wavelengths of signal light is decreased. For example, it is assumed that the number of wavelengths is decreased from two to one. The optical communication device 30 performs processing illustrated in the following steps.

(Step S61) The wavelength number measuring unit 38 measures the number of wavelengths 1.

(Step S62) The wavelength number measuring unit 38 notifies the controller 40 of the measured number of wavelengths 1.

(Step S63) The controller 40 notifies the amplifier controller 39 of the number of wavelengths notified from the wavelength number measuring unit 38.

(Step S64) The amplifier controller 39 performs ALC with the new number of wavelengths for the amplifier 31. At this time, the amplifier controller 39 calculates the level target set value of ALC taking into consideration the ASE correction in accordance with the number of wavelengths and performs ALC.

(Step S65) The amplifier controller 39 notifies the controller 40 of that the output of the amplifier 31 has reached the level target set value. Note that, the amplifier controller 39 performs ALC also after this so that the output of the amplifier 31 reaches the level target set value. At this time, the amplifier controller 39 takes the ASE correction amount into consideration.

Figure 19:
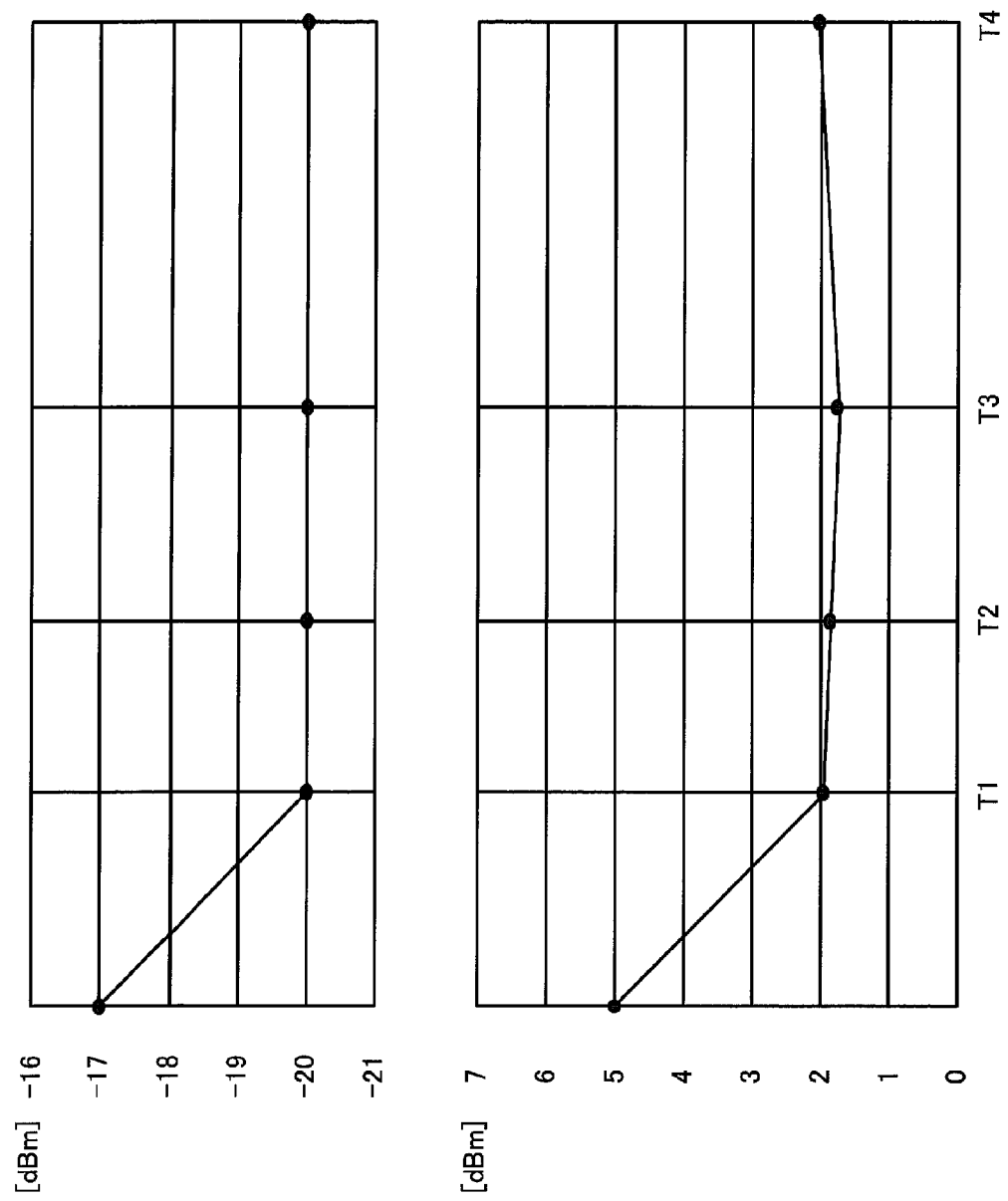
FIG. 19 illustrates an input power and an output power of an amplifier when the number of wavelengths is decreased.

FIG. 19 illustrates the input power and the output power of the amplifier when the number of wavelengths is decreased. The upper diagram of FIG. 19 illustrates the input power of the amplifier 31. The lower diagram of FIG. 19 illustrates the output power of the amplifier 31. The vertical axis represents the total power of the input and the output of the amplifier 31 and the horizontal axis represents time.

The interval between the time 0 and time T1 illustrated in FIG. 19 indicates the time necessary to decrease the number of wavelengths. The time T1 indicates the time when the decrement of the number of wavelengths is completed.

The interval between the time T1 and time T2 indicates the time taken for the wavelength number measuring unit 38 to measure the number of wavelengths. The time T2 indicates the time when the measurement of the number of wavelengths is completed and calculation of the level target set value is started.

The interval between the time T2 and T3 indicates the time necessary to calculate the level target set value of ALC. For example, the interval between the time T2 and T3 indicates the period of time during which the amplifier controller 39 calculates the level target set value at step S64 of FIG. 18.

The time T3 indicates the time when the amplifier controller 39 starts ALC. The interval between the time T3 and T4 indicates the time taken for the output of the amplifier 31 to reach the level target set value.

The time T4 indicates the time when the output of the amplifier 31 has reached the level target set value. The time T4 corresponds to, for example, the time when the amplifier controller 39 gives notification to the controller 40 at step S65 of FIG. 18.

Note that, the operation of the optical communication device 30 is simplified because AGC is not performed. On the other hand, the optical communication device 30 continues to operate under ALC also during the period of the AGC operation, and therefore, the time taken for the updated level target set value to be reached after the update is lengthened compared to the case where the AGC operation is performed. For example, the time interval between the time T3 and T4 illustrated in FIG. 19 is longer than the interval between the time T3 and T4 illustrated in FIG. 13.

As described above, it is possible for the optical communication device 30 to know the number of wavelengths of signal light to be received even when AGC is omitted and to perform, for example, ALC and ASE correction. That is, it is not necessary for the optical communication device 20 on the transmission side to include a device to transmit information of the number of wavelengths, such as an OSC, and it is possible to reduce the cost of the optical transmission system.

Fifth Embodiment

Next, a fifth embodiment is explained in detail with reference to the drawings. In the fourth embodiment, the wavelength number measuring unit 38 notifies the controller 40 of the measured number of wavelengths. In the fifth embodiment, the wavelength number measuring unit 38 notifies the amplifier controller 39 of the number of wavelengths. The optical communication device according to the fifth embodiment is the same as that of FIG. 14 and explanation of the block diagram thereof is omitted. However, the optical communication device 30 according to the fifth embodiment does not perform AGC.

Figure 20:
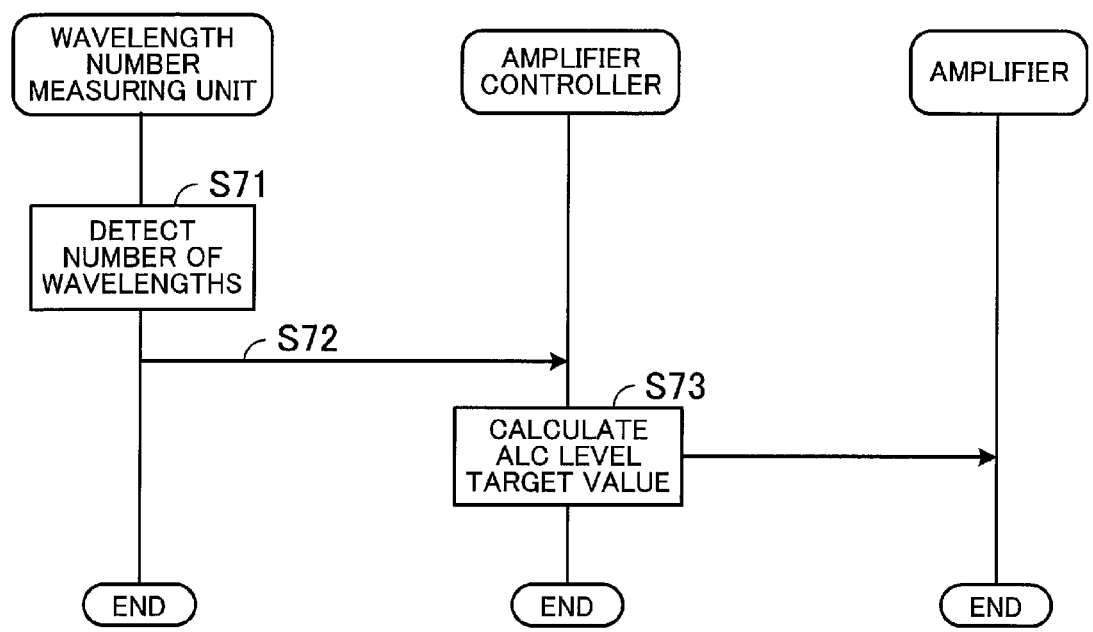
FIG. 20 illustrates an operation sequence of an optical communication device when the number of wavelengths is increased according to a fifth embodiment.

FIG. 20 illustrates the operation sequence of the optical communication device when the number of wavelengths is increased according to the fifth embodiment. It is assumed that the number of wavelengths is increased. For example, it is assumed that the number of wavelengths is increased from one to two. The optical communication device 30 performs processing illustrated in the following steps.

(Step S71) The wavelength number measuring unit 38 measures the number of wavelengths 2.

(Step S72) The wavelength number measuring unit 38 notifies the amplifier controller 51 of the measured number of wavelengths 2.

(Step S73) The amplifier controller 51 performs ALC with the new number of wavelengths for the amplifier 31. At this time, the amplifier controller 51 calculates the level target set value of ALC taking into consideration the ASE correction amount in accordance with the number of wavelengths and performs ALC.

After that, the amplifier controller 51 performs ALC so that the output of the amplifier 31 reaches the level target set value. That is, when the output of the amplifier 31 deviates from the level target set value, the amplifier controller 51 performs ALC so that the output of the amplifier 31 reaches the level target set value. When the number of wavelengths is decreased, the optical communication device 30 also performs the same processing as that of the sequence illustrated in FIG. 20, and therefore, explanation thereof is omitted.

As described above, it is possible for the optical communication device to know the number of wavelengths of signal light to be received even when AGC is omitted and the number of wavelengths is notified to the amplifier controller 51 and to perform, for example, ALC and ASE correction. That is, it is not necessary for the optical communication device 20 on the transmission side to include a device to transmit information of the number of wavelengths, such as an OSC, and it is possible to reduce the cost of the optical transmission system.

Sixth Embodiment

Next, a sixth embodiment is explained in details with reference to the drawings. In the second embodiment, the coupler 32 is provided in the subsequent stage of the amplifier (pre-amplifier) 31 and the light received from the transmission path is branched and the number of wavelengths of the signal light is measured. In the sixth embodiment, the light received from the transmission path in the previous stage of the pre-amplifier is branched and the number of wavelengths of the signal light is measured.

Figure 21:
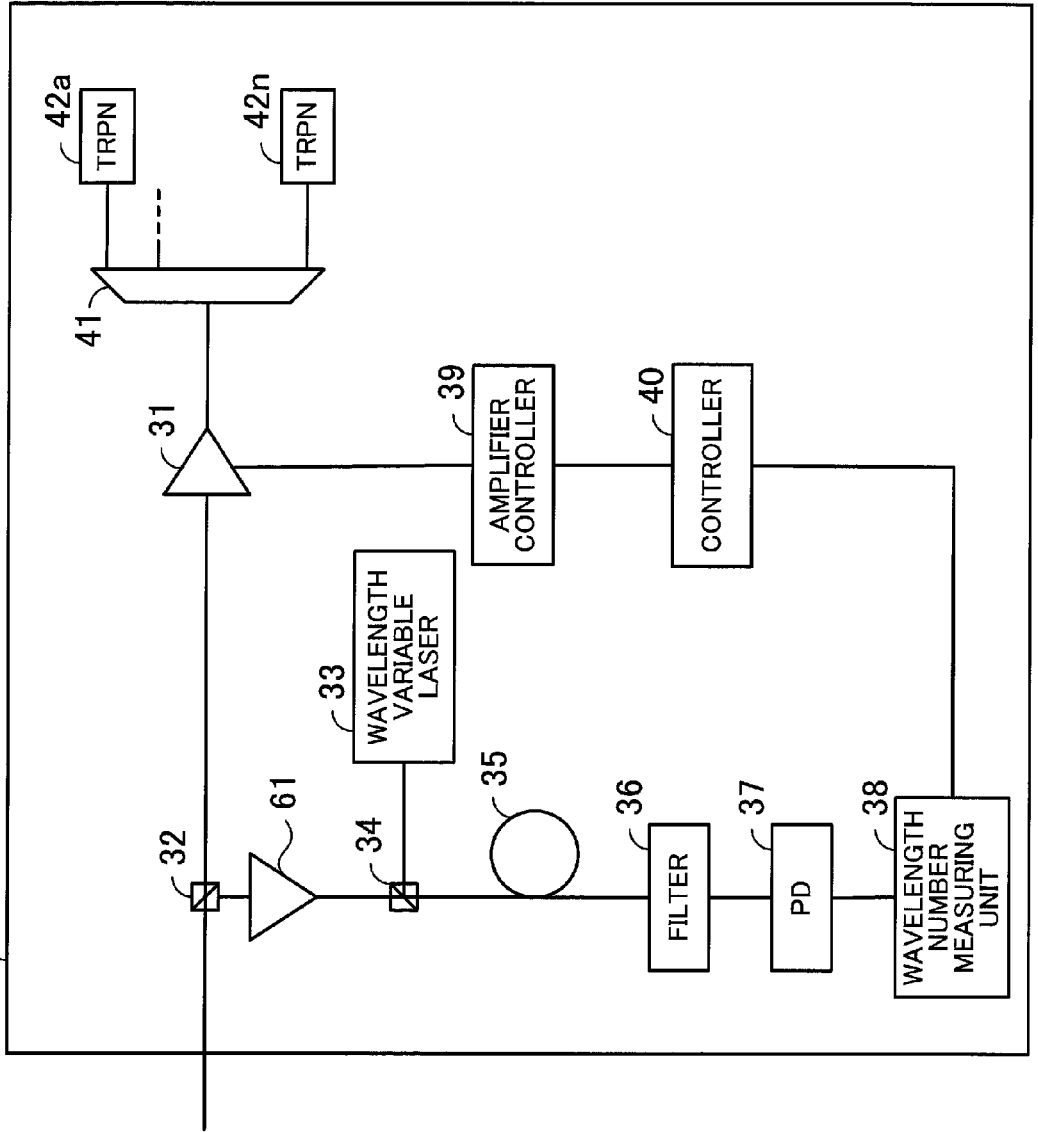
FIG. 21 is a block diagram of an optical communication device on the reception side according to a sixth embodiment.

FIG. 21 is a block diagram of the optical communication device on the reception side according to the sixth embodiment. In FIG. 21, the same symbols are attached to the same components as those of FIG. 4.

In the optical communication device 30 of FIG. 21, in the previous stage of the amplifier 31, the couplers 32 and 34, the wavelength variable laser 33, the optical medium 35, the filter 36, the PD 37, the wavelength number measuring unit 38, the amplifier controller 39, and the controller 40 are provided. Further, in the optical communication device 30, an amplifier 61 configured to amplify the light branched in the coupler 32 and to output the light to the coupler 34 is provided. The amplifier 61 amplifies the light branched in the coupler 32 so that a sufficient amount of FWM light is generated in the optical medium 35.

Note that, the operations of the couplers 32 and 34, the wavelength variable laser 33, the optical medium 35, the filter 36, the PD 37, the wavelength number measuring unit 38, the amplifier controller 39, and the controller 40 are the same as those of the optical communication device explained in FIG. 4, and therefore, explanation thereof is omitted.

As described above, it is also possible for the optical communication device 30 to find the number of wavelengths from the light branched in the previous stage of the amplifier 31. It is also possible to cause the optical communication device 30 according to the sixth embodiment to perform the operations explained in the third to fifth embodiments.

Seventh Embodiment

Next, a seventh embodiment is explained in details with reference to the drawings. There is a case where, for example, an optical repeater configured to amplify the signal light that attenuates in the transmission path is provided between the optical communication device on the transmission side and the optical communication device on the reception side. At this time, the optical repeater also has a device to measure the number of wavelengths similar to the optical communication device on the reception side explained above so that it is not necessary for the optical communication device on the transmission side to include a device to transmit information of the number of wavelengths.

Figure 22:
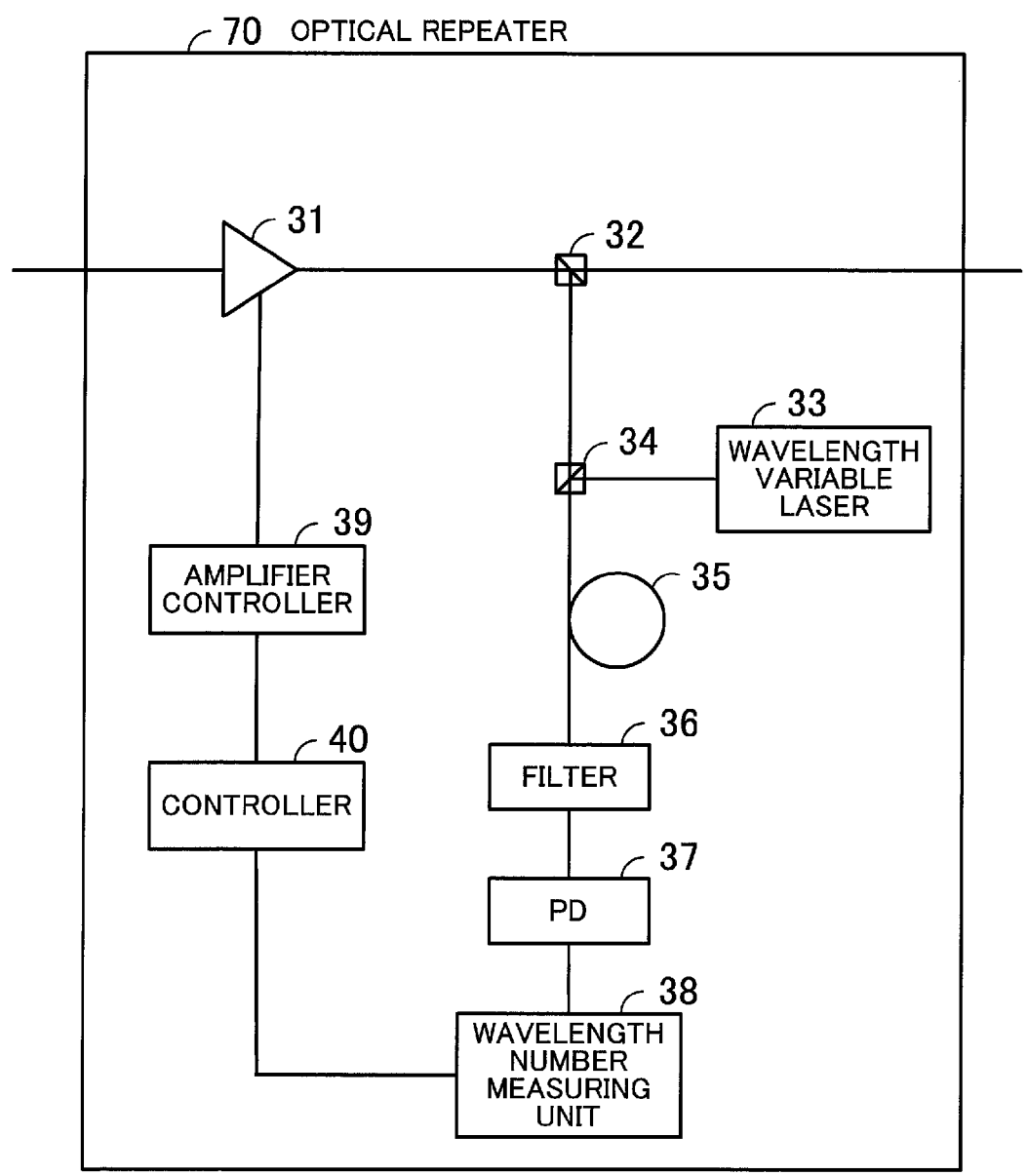
FIG. 22 is a block diagram of an optical repeater according to a seventh embodiment.

FIG. 22 is a block diagram of an optical repeater according to the seventh embodiment. An optical repeater 70 has the same block as that of the optical communication device 30 explained in FIG. 4. However, the optical repeater 70 does not have the optical demultiplexer 41 or the TRPNs 42a to 42n with respect to the optical communication device 30. That is, the optical repeater 70 amplifies the received signal light by the amplifier 31 and outputs the signal to the transmission path. It may also be possible to cascade-connect a plurality of the optical repeaters 70 between the optical communication device 20 on the transmission side and the optical communication device 30 on the reception side.

The operation of the block illustrated in FIG. 22 is the same as that of the block explained in FIG. 4. That is, it is possible for the optical repeater 70 to know the number of wavelengths of signal light to be received even if information of the number of wavelengths is not notified from the optical communication device on the transmission side and to perform, for example, ALC and ASE correction. Due to this, it is not necessary for the optical communication device on the transmission side to include a device to transmit the information of the number of wavelengths, and therefore, it is possible to reduce the cost of the optical transmission system.

Note that, it is also possible to cause the optical repeater 70 to perform the operations explained in the third to fifth embodiments. Moreover, it may also be possible to provide the coupler 32 in the previous stage of the amplifier 31 as in the sixth embodiment.

Eighth Embodiment

Next, an eighth embodiment is explained in details with reference to the drawings. In the eighth embodiment, the power of each wavelength is detected while sweeping the received light with a variable filter and the number of wavelengths of the signal light is measured.

Figure 23:
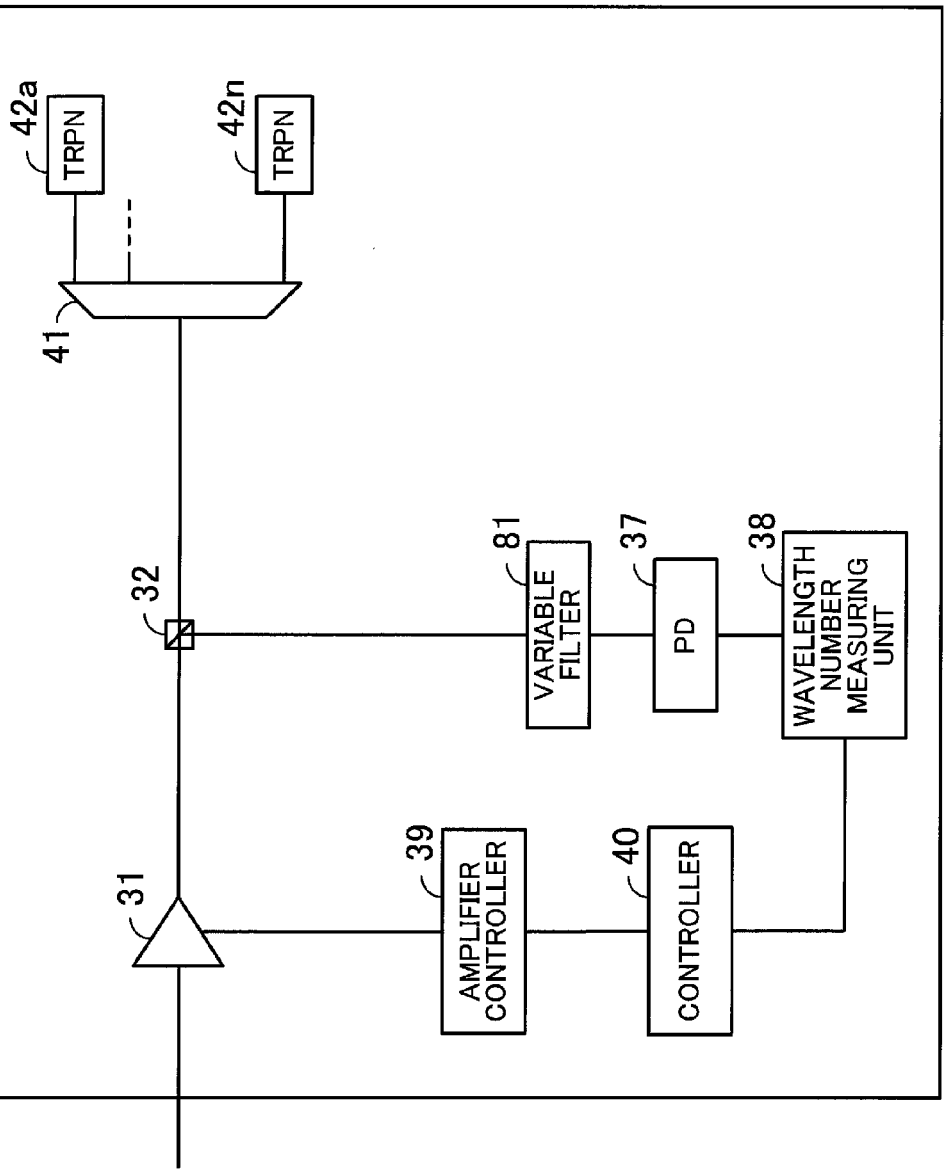
FIG. 23 is a block diagram of an optical communication device according to an eighth embodiment.

FIG. 23 is a block diagram of an optical communication device according to the eighth embodiment. In FIG. 23, the same symbols are attached to the same components as those of FIG. 4 and explanation thereof is omitted.

An optical communication device 80 illustrated in FIG. 23 does not have the wavelength variable laser 33, the coupler 34, and the optical medium 35 with respect to the optical communication device 30 illustrated in FIG. 4. Further, the optical communication device 80 illustrated in FIG. 23 has a variable filter 81 with respect to the optical communication device 30 illustrated in FIG. 4.

The variable filter 81 is a filter capable of varying the transmission band of the light branched in the coupler 32. Consequently, if the wavelength of the signal light received from the transmission path and the transmission band of the variable filter 81 overlap, the light is detected in the PD 37. That is, it is possible for the wavelength number measuring unit 38 to measure the number of wavelengths of the signal light transmitted from the optical communication device 20 on the transmission side.

The time taken to sweep the transmission band of the variable filter 81 is longer than the time in the case of the wavelength variable light of the wavelength variable laser 33. For example, the variable filter 81 of interference thin film type takes 80 nm/35 sec and the variable filter 81 of diffraction lattice type takes 40 nm/sec. In contrast, it is possible for the wavelength variable laser 33 to vary the wavelength in several microseconds as described above.

As above, it is possible for the optical communication device 30 to measure the number of wavelengths more quickly than the optical communication device 80 that uses the variable filter 81. This also applies to the optical repeater 70 explained in FIG. 22.

According to the disclosed optical communication device, it is possible to construct an optical transmission system at a low cost.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An optical communication device comprising:
   a light source capable of varying the wavelength of light to be output;
   a wavelength controller configured to control the wavelength of the light source;
   an optical multiplexer configured to multiplex light output from the light source with signal light received from a transmission path;
   an optical medium to which light output from the optical multiplexer is input;
   a monitor configured to monitor light having a predetermined wavelength output from the optical medium; and
   a wavelength number measuring unit configured to measure the number of wavelengths of signal light transmitted through the transmission path based on the result of monitoring by the monitor;
   wherein the wavelength number measuring unit measures the wavelength of the signal light based on the presence/absence of the light having the predetermined wavelength and the wavelength of wavelength variable light output from the light source.

2. The optical communication device according to claim 1, wherein
   the wavelength number measuring unit measures the number of wavelengths of the signal light based on the presence/absence of the light having the predetermined wavelength.

3. The optical communication device according to claim 1, further comprising an automatic level controller configured to correct spontaneous emission light at the time of automatic level control of the signal light based on the number of wavelengths measured by the wavelength number measuring unit.

4. A wavelength number measuring device comprising:
   a light source capable of varying the wavelength of light to be output;
   an optical multiplexer configured to multiplex light output from the light source with signal light received from a transmission path;
   an optical medium to which light output from the optical multiplexer is input;
   a monitor configured to monitor light having a predetermined wavelength output from the optical medium; and
   a wavelength number measuring unit configured to measure the number of wavelengths of signal light transmitted through the transmission path based on the result of monitoring by the monitor;
   wherein the wavelength number measuring unit measures the wavelength of the signal light based on the presence/absence of the light having the predetermined wavelength and the wavelength of wavelength variable light output from the light source.

5. An optical repeater comprising:
   a light source capable of varying the wavelength of light to be output;
   a wavelength controller configured to control the wavelength of the light source;
   an optical multiplexer configured to multiplex light output from the light source with signal light received from a transmission path;
   an optical medium to which light output from the optical multiplexer is input;
   a monitor configured to monitor light having a predetermined wavelength output from the optical medium; and
   a wavelength number measuring unit configured to measure the number of wavelengths of signal light transmitted through the transmission path based on the result of monitoring by the monitor;
   wherein the wavelength number measuring unit measures the wavelength of the signal light based on the presence/absence of the light having the predetermined wavelength and the wavelength of wavelength variable light output from the light source.

6. A wavelength number measurement method comprising:
   multiplexing light output from a light source with signal light received from a transmission path;
   causing the multiplexed light to enter an optical medium;
   monitoring light having a predetermined wavelength output from the optical medium;
   measuring the number of wavelengths of signal light transmitted through the transmission path based on the result of monitoring; and
   measuring the wavelength of the signal light based on the presence/absence of the light having the predetermined wavelength and the wavelength of wavelength variable light output from the light source.

* * * * *